(12) United States Patent
George et al.

(10) Patent No.: US 9,271,451 B2
(45) Date of Patent: Mar. 1, 2016

(54) STRIPPING APPARATUS

(75) Inventors: Nigel Hamish George, Amberley (NZ);
Marcus James Wickham, Blenheim (NZ); Albert Arnold Love, Amberley (NZ); Garry Trevor Love, Amberley (NZ)

(73) Assignee: Honeypot Holdings Limited, Christchurch (NZ)

( * ) Notice: Subject to any disclaimer, the term of this patent is extended or adjusted under 35 U.S.C. 154(b) by 272 days.

(21) Appl. No.: 13/817,432

(22) PCT Filed: Aug. 17, 2011

(86) PCT No.: PCT/IB2011/053642
§ 371 (c)(1),
(2), (4) Date: Apr. 18, 2013

(87) PCT Pub. No.: WO2012/023115
PCT Pub. Date: Feb. 23, 2012

(65) Prior Publication Data
US 2013/0199089 A1    Aug. 8, 2013

(30) Foreign Application Priority Data
Aug. 17, 2010 (NZ) .................................. 587416

(51) Int. Cl.
| | |
|---|---|
| A01D 46/00 | (2006.01) |
| A01G 3/08 | (2006.01) |
| A01D 46/28 | (2006.01) |
| A01B 41/04 | (2006.01) |
| A01G 17/02 | (2006.01) |
| A01G 3/04 | (2006.01) |

(52) U.S. Cl.
CPC . *A01G 3/08* (2013.01); *A01B 41/04* (2013.01); *A01D 46/285* (2013.01); *A01G 3/0408* (2013.01); *A01G 17/02* (2013.01)

(58) Field of Classification Search
CPC ..... A01D 46/285; A01D 46/28; A01D 46/00; A01G 17/00; A01G 17/02; A01G 17/026; A01G 3/08; A01G 3/0408; A01B 41/04
USPC ....... 56/12.8, 330, 340.1; 47/1.01 R, 58.1 FV
See application file for complete search history.

(56) References Cited

U.S. PATENT DOCUMENTS

| | | | | |
|---|---|---|---|---|
| 4,063,406 | A | * | 12/1977 | Burton ............................ 56/330 |
| 4,172,352 | A | * | 10/1979 | McCarthy et al. ............ 56/340.1 |
| 4,241,569 | A | * | 12/1980 | Bobard et al. .................. 56/330 |
| 2003/0033749 | A1 | * | 2/2003 | Morris et al. .............. 47/1.01 R |

* cited by examiner

*Primary Examiner* — Robert Pezzuto
(74) *Attorney, Agent, or Firm* — Stephen M. De Klerk

(57) ABSTRACT

An apparatus (20) for use in stripping irregular material (8) from a line (3, 4) during relative movement between the apparatus (20) and line (3, 4), including a material guide (50), stripping mechanism (40) and line guide (30). A first line guide element (30*a*), first stripping element (40*a*) and first material guide element (50*a*) collectively form a first stripping assembly and the second line guide element (30*b*), second stripping element (40*b*) and second material guide element (50*b*) collectively form a second stripping assembly, the line passing between the stripping assemblies during stripping. The stripping assemblies are orientated during stripping such that the first material guide rotation axis and the first stripping element rotation axis are on a first lateral side of the line and the second material guide rotation axis and the second stripping element rotation axis are on a second lateral side of the line.

33 Claims, 16 Drawing Sheets

STRIPPING APPARATUS

CROSS-REFERENCE TO OTHER APPLICATIONS

This is a National Phase of International Application No. PCT/IB2011/053642 filed on Aug. 17, 2011, which claims priority from New Zealand Patent Application No. 587416 filed on Aug. 17, 2010.

TECHNICAL FIELD

The present invention relates to improvements in apparatus for stripping irregular material from a line.

BACKGROUND ART

To aid clarity and to avoid prolixity the present invention will be described herein with respect to stripping of grapevine material after pruning in grape vineyard operations for which the present invention has particular application. However, it should be appreciated that the principles of the present invention may find use in other applications and thus reference herein to vineyard stripping and pruning should not be seen to be limiting.

By way of example only, the present invention may also have application in:
- other horticultural operations where foliage or other plant material is required to be removed from a wire, line or the like;
- aquaculture and/or marine applications where seaweed, molluscs or other organisms need to be removed from cables, chains, rope or the like;
- removing unwanted foliage from power wires, guy-ropes, cables or the like.

As part of annual maintenance of grapevines it is necessary to remove old, weak, diseased, non-productive or otherwise unsuitable "cordons" or "canes" of the grapevine. A "cordon" or "cane" refers to a branch of a woody plant to be pruned or left to bud.

Single plants can be pruned to have single or multiple cordons/canes in a number of methods. The two most prominent methods of pruning are known as "spur-pruning" and "cane-pruning" which suit different types of terroir and grape varieties.

Spur-pruning can be used on any variety but is ideally suited to grape varieties that are fruitful in the bud area near the trunk of the vine. Any shoots growing near the trunk are removed and the vine pruned such that the vine consists of a series of 'spurs' growing from the cordons which are wrapped about a fruiting wire, i.e. a fixed wire to which the cordons are attached. Thus, spur-pruning results in an array of spurs projecting from the cordons at regular distances from the trunk. The spurs are cut back each year to produce new shoots which bear fruit.

Cane-pruning is described more fully below and is typically used on varieties where the buds closest to the trunk are unfruitful or whose bunches are small. Cane-pruning leaves a select few canes each year extending from the trunk to act as the 'fruiting wood'. This selection ensures all the nutrients and energy of the vine are taken up by the select canes and thus promotes a full crop from the selected canes over a shorter time-period. In contrast a vine "spur-pruned" spreads the nutrients and energy over multiple spurs over the growing season.

Spur-pruning produces a relatively greater yield in consistent growing conditions over the season but can result in low yield or quality where conditions are variable or the grape variety is generally low-yielding. For example, frosts may result in poor growth on the closest spurs to the trunk while summer drought may result in poor growth on the outer spurs later in the season. In contrast, cane-pruning ensures most shoots grow simultaneously with all the nutrients and energy being available to the shoots over the season. Thus, while spur-pruning can be used in many climates, the highly variable weather conditions in New Zealand and many other regions require cane-pruning to ensure adequate harvest.

"Cane-pruning" or "cordon-pruning" of unwanted canes from Grapevines is a labour intensive operation and can be broken down into four distinct tasks as follows:

1. Cordon Selection

The first stage of cane-pruning involves "pre-cutting" to select and cut the unwanted canes away from the head of the vine leaving a number of canes selected with the attributes of:
- originating from an area close to the head or crown of the vine;
- full length and not stunted;
- undamaged and free of disease;
- golden brown in colour;
- having a sufficient number of healthy buds;
- sufficient thickness, e.g. thick or thicker than a human finger.

The cane selection stage is performed manually by a skilled labourer as the selection of appropriate canes can have a high impact on the short and long term productivity of a mature vine.

2. Cutting the Unwanted Cane

The unwanted canes are then cut from the fruiting wire to which they were wrapped about during the previous season's pruning. This cutting makes manual 'stripping' of the cut canes easier. This further cutting process is relatively unskilled compared with the cane selection and is usually performed in tandem with cane selection.

3. Stripping Out

The unwanted canes make up about 90% of the total growth on a mature vine and are often tangled in amongst the foliage, wires or other canes, thereby preventing them from falling away from the vine once cut. These unwanted canes must be removed manually in a process referred to as "stripping-out". Stripping-out generally involves a person gripping the unwanted canes and ripping them away from the vine and wires in a downward motion. Stripping-out can be physically demanding and time consuming. Moreover, stripping-out may also be hazardous when canes are ripped free of the vine as they may whip the person in the face and eyes.

4. Trimming and Wrapping

Once the stripping-out is complete the remaining canes are trimmed to length and shape and wrapped on to the fruiting wire ready for the next growing season. These processes are also done manually and while trimming is generally unskilled, wrapping requires skilled labour.

Thus, cane-pruning of grapevines is a labour-intensive process that has a number of sub-processes requiring skilled workers.

Spur pruning is a faster and less-skilled hand-pruning technique than cane-pruning as there is no selection stage and the spurs are simply pruned back to the required length. The relative simplicity of spur-pruning means that cutting machines can be used to run along the vine and cut the spurs back to a consistent level. In contrast, cane-pruning leaves unwanted canes wrapped about the fruiting wire and thus the cutting techniques of the spur-pruning machines may cut the fruiting wire and/or may not adequately remove the canes.

While a number of machines have been developed to alleviate the heavy manual requirement of spur-pruning grapevines, there has been little development in machines for cane-pruning given the high-skill requirement.

Typical prior art electrical wire strippers are also unsuitable as they cannot be used to strip cut canes of grapevines, other organic material or any intrinsically irregular material that grows on the line. It is inherently difficult to ensure that all of the material on the line is stripped as electrical wire strippers rely on the material and line being fixed in position and dimensions, or alternatively rely on the wire stripper blades moving to accommodate any irregularity.

Attempts at reducing at least some of the labour component of cane-pruning have been made and described in New Zealand patent number NZ560554 by Langlois. The Langlois machine has two contra-rotating rollers in a confronting relationship either side of the row of vines. The rollers are positioned above the wires such that the rollers grip the upper portions of the unwanted canes and pull them from the wires. The rollers are attached to the boom of a tractor or the like which can then move along the row of vines.

While the Langlois machine offers a mechanical alternative to manual stripping of the canes, there are a number of problems that may arise in operation. For example:
- the rollers must be lifted over each post along the row of vines thereby reducing speed and efficiency;
- the rotating rollers rip the canes from the wire with substantial force, thereby potentially damaging any uncut canes or detaching the fruiting wire from the posts;
- the stripped canes are ejected upwards in the Langlois device at substantial speed, and these may land on the tractor, personnel, other vines or otherwise prove undesirable;
- the canes are required to extend above the wire to be effectively stripped which means conventional "pre-pruning" or "summer" pruning must be reduced.

Typical prior art wire strippers are also unsuitable as they cannot be used to strip cut canes of grapevines, other organic material or any intrinsically irregular material that grows on the line. It is inherently difficult to ensure that all of the material on the line is stripped as the prior art wire strippers rely on the material and line being fixed in position and dimensions, or alternatively rely on the wire stripper blades moving to accommodate any irregularity.

Some of the inventors of the present invention devised a stripping apparatus that solved many of the aforementioned problems. This stripping apparatus is described in WO/2009/051498 by George et al.

As described above, grapevines are grown on a trellis system located on one side of a row of supporting posts. Each trellis is grown on the same side of each row of posts, i.e. normally on the sunward-facing side. While this arrangement provides optimal growing conditions it presents a problem for pruning and stripping operations. It is normally convenient for the stripping/pruning apparatus to be located on one side of a carrier, tractor or harvester. However, once the apparatus has completed a row the carrier cannot simply turn down the next row as the apparatus will be on the opposite side of the carrier to the trellis system to be stripped. This problem is illustrated in FIG. 2.

Typical prior art solutions to this problem include either using two stripping apparatus (one on either side of the carrier to alternately strip each row) or alternatively to drive the carrier back to the start of each row after each stripping operation.

Another solution, albeit complex and inconvenient, is to construct the stripping apparatus with the carrier mounting and drive connector on both sides of the apparatus so that it can be disconnected and re-mounted on either side of the carrier at the end of each row. However, it will be obvious that disconnecting the apparatus would normally take longer and present more difficulty than simply driving back to the start of the next row.

It will be appreciated that such prior art methods either duplicate the cost of the stripping apparatus or increase the time and fuel costs for operation of a single stripping apparatus.

Some vineyards include vine-rows that extend over undulating ground which results in loosening tension on the wire when detached from the posts and/or where the vertical tension of the wires reverses over their length. This reversed tension presents problems for the George et al. machine if the tension is directed toward away from the line guide as the wires may exit the line guide and be cut by the surrounding blades. Similarly, where the wire tension is too loose the wire may bend around the line guide, exit and become entangled in the blades and be damaged.

Further problems arise where the wire is made from steel that is too soft as narrow and restrictive channels may abrade the steel. Similarly, any galvanizing on the wire may also be abraded.

The prior art may also not be able to accommodate more than one wire at a time which is important for effectively stripping material. Stripping wires individually may function when the material is wrapped tightly around the wire. However, in many applications, the material is only loosely wrapped about the wire and thus there is potential for any stripping mechanism contacting the loose material to push the loose material along the wire without stripping it. Moreover, in combined stripping and mulching devices the loose material may drop off the wire before being mulched. In contrast, if multiple wires are picked up together they act to pinch the material between adjacent wires and hold the material in place while being stripped, thereby minimising any longitudinal slipping of the material along the wire or premature stripping.

In some vine-growing operations the vines are only spur-pruned and the fruiting canes left on the lifting wires for multiple seasons. These operations result in larger, harder canes wrapped about the wires which are correspondingly harder to remove and using manual labour to remove such canes can be prohibitively expensive. These operations therefore leave the canes on the lifting wires for the useful life of the plant and then the entire plant and wire system are removed and new vines planted, obviously at great expense.

It would therefore be advantageous to provide an improved method and apparatus for stripping the unwanted canes from the fruiting wire.

In particular it would be advantageous to provide an improved apparatus and/or method that may address at least one of the following relative to the prior art:
  reduced size;
  accommodate multiple lines;
  operate on both sides of the carrier;
  eliminate need for duplicate devices;
  operate over undulating ground, i.e. lines with portions of opposite vertical tension;
  strip variable tension lines and particularly loose lines;
  reduce damage to softer wires and/or galvanizing;
  cut the material into small pieces;
  strip larger and harder material.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

As used herein and throughout the specification the term 'stripping' refers to the process of removing material from an object, e.g. removing cut grapevines from wires. Stripping may include any process, method or means for removing material from an object and by way of example may include cutting, mulching, striking, rubbing, pulling, sawing, ripping, slicing, or any other removal process. It should also be appreciated that reference herein to the term stripping should be understood to include partially and/or fully removing, some, or all material from the line.

To aid clarity and to avoid prolixity, the present invention will be described herein with respect to 'stripping' unwanted irregular material in the form of cordons (hereinafter 'canes') of a grapevine from a wire for which the present invention has particular application. However, it should be appreciated that the principles of the present invention may find use in many applications that require irregular material to be stripped from a line and thus reference herein to stripping canes from a line should not be seen to be limiting.

It will be understood that reference herein to a 'line' refers to any length of material and by way of example includes wire, rope, string, cable, monofilament, chains, vines, or the like.

As used herein, the term 'organic' should be understood to refer to any material of, pertaining to, or derived from living organisms and includes dead plants or animals.

As used herein, the term 'irregular material' includes material of varying thickness, length, composition, orientation and/or separation on the line.

As used herein the term 'vertically displace' refers to any action that results in a displacement or movement with at least a partial component vertically upwards or downwards.

As used herein, the term 'roller' refers to any rotatable member having a surface orientated about its axis of rotation. It should be appreciated that the roller need not be elongate and the shape of a roller need not be continuous along its length or about its circumference. It should also be appreciated that a roller may rotate passively or may be driven unless otherwise specified.

As used herein the term 'mounting' refers to any member, element, structure, portion, assembly, arrangement, or mechanism to which another element or member is coupled to and is capable of transmitting motion from a drive mechanism, e.g. a motor).

By way of example, a mounting may include:
rotatable shaft;
piston rod;
axle;
cam;
chain link;
caterpillar track.

The term inverted as used herein should be understood to refer to a change in orientation of an object from an initial orientation to a substantially reversed, reflected, reciprocal, rotated or opposing orientation.

According to a first aspect of the present invention there is provided an apparatus for use in stripping irregular material from a line during relative movement between the apparatus and line, said apparatus including a material guide, stripping mechanism and line guide:

said material guide being configured to guide the irregular material on the line into engagement with the stripping mechanism during said relative movement, said material guide including first and second driven material guide elements respectively rotatable about first and second material guide rotation axes;

said stripping mechanism including first and second driven stripping elements respectively rotatable about first and second stripping element rotation axes;

said line guide including first and second line guide elements;

wherein the first line guide element, first stripping element and first material guide element collectively form a first stripping assembly and the second line guide element, second stripping element and second material guide element collectively form a second stripping assembly, the line passing between said stripping assemblies during said stripping, said stripping assemblies orientated during said stripping such that the first material guide rotation axis and the first stripping element rotation axis are on a first lateral side of the line and the second material guide rotation axis and the second stripping element rotation axis are on a second lateral side of the line.

To aid clarity, the apparatus will hereinafter be described with respect to the apparatus configuration during stripping unless otherwise specified.

The apparatus is preferably operated to move the line laterally away from an original position and a lateral tension thus results on the line, e.g. in vineyard operations, the wires remain attached at end points while the wires are moved outwards and upwards or downwards. Thus, reference hereinafter to 'lateral line tension' should be understood to refer to this resultant tension.

Preferably, the first and second line guide elements are respectively located on said first and second sides of the line.

Preferably, the line is laterally constrained within a passage through the apparatus defined sequentially by the space between the:

first and second material guide elements in the plane extending between the first and second material guide element rotation axes;

first and second stripping elements in the plane extending between the first and second stripping element rotation axes;

first and second line guide elements in the plane extending between the first and second line guide elements.

Preferably, the first stripping assembly is configured such that the first stripping element is interposed between said first material guide element and said first line guide element and the second stripping assembly is configured such that the second stripping element is interposed between said second material guide element and said second line guide element.

Preferably, the line is laterally constrained within a volumetric passage defined by the:
the first and second material guide elements in the plane extending between the first and second material guide element rotation axes;
the first and second line guide elements in the plane extending between the first and second line guide elements, and
at least two transverse constraints.

The passage between the material guide elements is thus partially defined by the space between the material guide elements of the closest opposing outwardly extending protrusions The stripping apparatus can thus operate with lateral line tension directed in any direction as the line is confined within a volume. The apparatus may also operate in applications where the line tension may reverse, such as in vineyards with undulating terrain over which wires extend. The volumetric passage also allows more lines to be accommodated e.g. the fruiting wires and lifting wires of a vineyard may all pass through the stripping apparatus thereby providing more convenient operation as the lifting wires do not have to be moved away from the stripping apparatus to avoid being damaged. Furthermore, when the fruiting and lifting wires are stripped together they are moved closer to each other than when on the vineyard row and thereby act to pinch material between each other, thereby effectively holding the material in position to be stripped rather than allowing the material to be pushed along by the material guide, as may be possible with single wire stripping.

Preferably, the span between:
the line and any material, and
either, or both of, the first and second stripping elements is/are unobstructed.

Reference herein to being 'obstructed' or an 'obstruction' should be understood to refer to any impediment or obstruction caused by apparatus components and not by the line, material, environmental or external items.

The stripping elements are thus capable of stripping as close to the line as possible without encountering an obstruction such as a channel, wall or other apparatus components.

Preferably, said first and second stripping assemblies are substantially opposing.

Preferably, the aspect ratio of the space between the closest portions of the:
transverse constraints, to
first and second line guide elements,
is at least 5:1 (five-to-one) and more preferably is at least 10:1 (ten-to-one).

Preferably, the aspect ratio of the space between the closest portions of the:
transverse constraints, to
first and second material guide elements,
is at least 5:1 (five-to-one) and more preferably is at least 10:1 (ten-to-one).

The apparatus may therefore be capable of simultaneously stripping multiple lines which therefore offer a number of advantages, including at least one of:
negating the need for multiple channels or additional mechanisms;
improved stripping as the material may be 'pinched' between multiple lines and thus is prevented from being pushed along the line;
reduced stripping time as the multiple lines are not required to be stripped sequentially and/or separately.

Preferably, during stripping, both the first and second stripping assemblies are capable of resisting lateral tension with vertical and/or horizontal components. The material on the line can thus be displaced downwards or upwards depending on the location and orientation of the material as it enters the stripping apparatus. The stripping apparatus may thus be used in both upright trellis vineyards (where the canes grow upwards) and hanging trellis vine arrangements (where the canes grow downwards). The stripping apparatus may also operate in other applications where line tension varies, e.g. in vineyard rows extending over undulating terrain.

Any vertical displacement also acts to tension the line vertically which may assist in pulling any material vertically away from any uncut material to be retained. There may also be a component of horizontal tension present depending on the orientation and relative position of the machine to the line's original equilibrium position.

Preferably, the stripping apparatus is capable of being re-orientated from a first orientation wherein the first stripping assembly resists lateral line tension and a second orientation wherein the second stripping assembly resists lateral line tension.

Preferably, the lateral line tension resistance is provided by said first line guide element and/or said first material guide element in said first orientation and said second line guide element and/or second material guide element in said second orientation.

Preferably, said stripping apparatus is re-orientated between said first and second orientations by at least partially inverting the stripping apparatus.

More particularly, said apparatus is preferably re-orientated between the first and second orientations by pivoting said apparatus about a reorientation pivot axis.

Preferably, the re-orientation pivot axis is orientated in a plane passing substantially between the stripping assemblies.

Preferably, said re-orientation pivot axis is perpendicular to a said stripping element rotation axis and/or a said material guide rotation axis.

Preferably, said apparatus is capable of being pivoted about the re-orientation pivot axis through at least 45 degrees and more preferably through at least 180 degrees. The operator can thus reorientate the apparatus to the orientation where the resultant lateral line tension is substantially perpendicular to the rotation axis of the material guide axis and/or stripping element axis.

The stripping apparatus may thus operate in a wide range of orientations, including fully inverted, i.e. 180 degree pivoting about the reorientation axis. It is thus possible for a single such stripping apparatus to strip alternate rows of a vineyard without requiring another duplicate stripping apparatus on the other side of the carrier.

In one preferred embodiment, the apparatus is configurable between:
an open configuration, and
a closed 'stripping' configuration wherein the first and second stripping assemblies are respectively moved to said first and second sides of the line.

To prepare the apparatus for operation, the apparatus is preferably positioned in the open configuration and one of the stripping assemblies positioned on the first or second side of the line. The apparatus is then reorientated and/or repositioned to the closed configuration to constrain the line in the passage between the stripping assemblies. It will be appreciated that in order to reconfigure the apparatus between the open and closed positions the first stripping assembly may be moved, the second stripping assembly may be moved or both stripping assemblies may be moved.

The apparatus, is preferably formed as two halves, each half including a stripping assembly and wherein said halves are capable of being reorientated and/or repositioned between the open and closed configurations.

Preferably, the stripping apparatus is configurable between the open and closed positions by respectively pivoting the first and/or second stripping assemblies about first and second assembly pivot axes. The first and second assembly pivot axes are preferably coaxial though in alternative embodiments may be separate or parallel.

It will be appreciated that the material guide, stripping mechanism and line guide are preferably separate and distinct components with correspondingly separate functions.

Preferably, the line guide elements have a primary axis extending non-parallel to the line.

Preferably, the primary axis of the first line guide element and the rotation axis of the first material guide element are substantially parallel.

Preferably, the primary axis of the second line guide element and the rotation axis of second material guide element are substantially parallel.

Preferably, in the closed configuration the primary axes of the line guide elements and the rotation axes of the material guide elements are substantially parallel.

Preferably, the first stripping element rotation axis is substantially parallel to the first material guide element rotation axis.

Preferably, the second stripping element rotation axis is substantially parallel to the second material guide element rotation axis.

Preferably, in the closed configuration the primary axes of the line guide elements and the rotation axes of the stripping elements are substantially parallel.

Orientating the stripping elements parallel to the material guide elements allows a maximising of the cutting area of the stripping elements even while minimising the space between the first and second stripping elements to move as close to the line as possible. The lines can also be conveniently located on the stripping assembly as there is effectively a single side of the passage between the material guide element and parallel line guide on which the lines may be located. In contrast, non-parallel components will normally require the lines to be located on each component separately to suit the different orientations.

Preferably, the first and second stripping assemblies are substantially symmetrical about a central axis and/or plane of the passage.

The George et al. prior art described above may encounter problems with loose line that may bend, flex or otherwise come into contact with the corresponding stripping mechanism or exit the line guide channel. Consequentially, the larger the separation between sequential components of the present stripping apparatus, the larger the area and longitudinal length is available for the line to move and flex.

Preferably, the material guide and stripping mechanism are adjacent and in immediate proximity to each other and more preferably the stripping mechanism and line guide are adjacent and in immediate proximity to each other. The distances between the material guide, stripping mechanism and line guide are thus minimised.

Preferably, there are no intervening obstructing elements between the material guide and stripping mechanism and/or between the stripping mechanism and line guide with respect to the direction of relative line movement.

The irregular material is by its very nature variable in size and composition and therefore may not be distributed evenly along the line, e.g. there may be collections of material that may be too large to fit between or be compacted by the material guide elements, thereby jamming the stripping apparatus and potentially causing damage.

Thus, in one preferred embodiment, the passage volume may be increased by increasing the separation between the first and second material guide elements and/or between the first and second line guide elements.

In an alternative embodiment, the first and second stripping assemblies are movable relative to each other to increase said passage volume.

The material guide elements have forces applied to them from the lateral line tension and from any incoming material or object that is larger than the corresponding separation between the material guide elements. Thus, large clumps of material may apply forces transverse to the material guide element rotation axes.

Preferably, the stripping apparatus is capable of altering said passage volume in response to changes in at least one force change applied to a said material guide element and/or a said line guide element. Preferably, said force change is detected by a force sensor such as a pressure sensor in hydraulic lines, mechanical force transducer, or the like. The force change detected may be in any suitable direction(s) but is preferably in the direction of relative line movement or perpendicular to the material guide rotation axis. Similarly, the force change detected may be perpendicular to the line guide primary axis.

In an alternative embodiment, said passage volume is controlled by a biasing mechanism configured to bias the material guide elements and/or line guide elements toward the closed configuration. Thus, if a clump of material enters the material guide it may push the material guide elements apart against the bias force, thereby entering the passage without jamming the material guide. It will be appreciated that the tension of the biasing mechanism may be calibrated to suit the particular application.

Preferably, the material guide elements are configured to rotate in opposite directions during stripping, i.e. the material guide elements are contra-rotating or counter-rotating.

Preferably, said material guide element includes outwardly extending protrusions for assisting in vertically displacing the material, gripping material on the line and guiding the material toward the stripping mechanism.

Preferably, said protrusions are ridges and/or may be flanges, teeth, spikes, brushes, undulations, blades, tines, serrations, claws, saws, hammers or the like.

The ridges preferably have a series of wedge-shaped serrations to assist in gripping the material.

Preferably, a said material guide element includes a roller with said outwardly extending protrusions.

Preferably, the outwardly extending protrusions are parallel to the roller rotation axis.

The outwardly extending protrusions preferably rotate to vertically displace the line and material above and below the line.

The outwardly extending protrusions on the first and second material guide elements thereby impel the material toward the stripping mechanism when rotating.

The material guide elements are preferably driven to assist:
jamming of material in the material guide is minimised;
in pulling the cut canes in vineyards away from the retained vines;

in forcibly gripping the material between opposing material guide elements, and in preventing any material on the line being pushed along the lines without being stripped.

The aforementioned stripping apparatus thus may have two driven rotatable material guide elements on opposing sides of the line that are both capable of vertically displacing the material. The material can thus be displaced downwards or upwards depending on the location and orientation of the material as it enters the material guide. The stripping apparatus may thereby be used in both upright trellis vineyards (where the canes grow upwards) and hanging trellis vine arrangements (where the canes grow downwards) e.g. the lower material guide element may lift the canes in the upright trellis or the upper material guide element may pull the canes downwards in the hanging trellis. The stripping apparatus may also operate in other applications where line tension varies, e.g. in vineyard rows extending over undulating terrain.

Plants produce buds that generally grow upwards and outwards from the plant stem to form new plant material. In grape-growing operations the buds tend to grow at a point near the end of the canes and form the bulk of the fruiting potential for the following season's growth. These buds can be very vulnerable to damage. It will be appreciated to one skilled in the art that in most applications the plant growth will be generally upwards in wine-growing operations or downwards in raisin, sultana and/or table-grape growing operations. Thus, in the stripping apparatus as aforementioned, the cut material may be moved vertically away from the supports by the material guide elements at least partially in a direction substantially similar to the general direction of predominant plant growth to thereby minimise the risk of striking and removing the buds. The aforementioned methods also reduce potential damage to the plants by moving the line vertically and outwardly as, at least in grape-growing operations, the buds are mostly located in the lee (with respect to the direction of growth) of old leaf scars which can act as natural shields for the buds as the line moves past. The vertical displacement helps to pull the irregular material at least partially vertically from any material to be retained while minimising damage to the retained material.

A constricting aperture or region is thus preferably formed from confronting parts of the material guide elements to constrict the material as it passes through the material guide.

Preferably, the rotation speed of the material guide is governed by the speed of relative line movement. In vineyards it may be undesirable for the material guide elements to eject the material toward the stripping mechanism at such a speed that the stripping elements are unable to strip effectively. It may also be undesirable for the material guide elements to grip the line and increase the longitudinal tension of the line. Thus, the material guide elements may rotate at a speed that matches the speed of line movement to avoid such issues.

In one preferred embodiment, at least one said material guide element may be configured to oscillate in a direction along said rotation axis. Preferably, both material guide elements are configured to oscillate in opposing directions to each other along their respective rotation axes. This oscillation may assist in 'rolling' material between the opposing material guide elements which may thereby increase the stripping effectiveness by 'unwinding' material on the line.

Preferably, said first and second stripping elements are respectively connected to movable, first and second stripping element mountings located during stripping on said first and second sides of the line.

Preferably, the stripping elements are configured to rotate in opposite directions during stripping, i.e. the stripping elements are contra-rotating or counter-rotating.

Preferably, the movable stripping element mountings preferably include a hub, axle, shaft, cylinder or other rotatable member.

Preferably, each said stripping element is selected from the group including: blades, teeth, tines, flails, serrations, claws, saws, hammers, spikes, brushes, ridges.

Preferably, the first material guide element rotates in an opposite direction to the first stripping element. Similarly, the second material guide element rotates in an opposite direction to the second stripping element.

Preferably, the stripping elements are blades. It will be appreciated that numerous blade configurations are also possible, including:

blades of varying thickness and length;
circular blades;
tapered blades;
blades having a curved transverse cross-section;
serrated, saw-tooth, irregular or wedge-shaped blades;
any combination of the above.

Preferably, a said stripping element includes at least one blade with a leading edge orientated parallel to the stripping element rotation axis. Preferably, said leading edge is continuous.

Preferably, said stripping element leading edges are configured to delineate a cylindrical volume about the stripping element rotation axis. The blades are also preferably orientated tangentially with respect to said cylindrical volume. The attached stripping elements thus rotate with leading edges that delineate corresponding arcs either side of the line to contact the material attached to the line to cut and/or dislodge the material.

In contrast to radially extending stripping elements extending from hubs, this 'tangential' blade configuration ensures that if the line is not effectively confined within the passage the line will only be contacted by a blade moving tangentially through a small section of the delineated arc. Therefore the blades move in a direction parallel to or at a relatively shallow angle toward or away from the length of the line, thereby mitigating the risk of damaging the line. Moreover, as the stripping element moves through the arc it will act to impact any line back toward the passage, thereby avoiding any entanglement or other damage to the line.

In vineyard-pruning the unwanted vine material is generally mulched and used as fertiliser or discarded. The unwanted material is thus typically stripped from the line by hand and placed in the avenues adjacent the row of vines. A "chipper" (apparatus used to cut organic material into pieces) or mower is then driven over the discarded material to shred into finer pieces. Thus, by providing cutting blades for stripping the material, the present invention may not only strip the material from adjacent the line, but also cut the material into smaller pieces for disposal or recycling, thereby negating the need for a separate chipping or mulching apparatus.

The line guide elements may be formed from any members capable of constraining line movement and preferably the line guide elements include members selected from the group including plates, bars, beams, loose or taut wires, tracks, belts, grooves, wheels, sheaves, bearings, ridges, lips, ledges, extrusions, rollers, blades.

Preferably, the line guide elements include cross-members and more preferably cross-members that have leading edges orientated toward said stripping elements and formed as a blade edge for assisting removal of material on the line passing between the line guide elements.

In one preferred embodiment, the first and second line guide elements may include rollers respectively locatable during stripping on the first and second lateral sides of the line. The line guide rollers may rotate passively or may be actively driven.

Preferably, said transverse constraints are provided at or adjacent axial ends of a said material guide element. The transverse constraints prevent the line from exiting the passage and being damaged or jamming the material guide. The transverse constraints may also act to guide the material toward the stripping mechanism.

Preferably, the transverse constraints may include members, walls, rollers or the like which may be discrete, continuous or semi-continuous.

Preferably, the transverse constraints include members orientated substantially perpendicular to a material guide element rotation axis.

Preferably, the transverse constraints include at least one rotatable member rotatable about an axis non-parallel to a said material guide element rotation axis and more preferably, perpendicular to said material guide element rotation axis.

The rotatable transverse constraints may include at least one roller, cone, screw, auger or may be shaped similarly to a said material guide element.

It will be appreciated by one skilled in the art that stripped material may be ejected upwards, potentially falling onto the carrier, operator or vines. The apparatus therefore preferably includes a housing having a first and second halves to which the first and second stripping assemblies are preferably mounted. It should be appreciated that the housing need not be fully 'enclose' the apparatus components and may include deflector plates or the like for deflecting material stripped by the stripping mechanism. Such a housing may help to ensure that the material is guided through the apparatus and ejected in the required direction as well as offering a mounting for the stripping assemblies.

Preferably, the material guide is located at an entry opening to the housing and preferably the line guide and stripping mechanisms are located within the housing.

Preferably, the housing halves form transverse constraints for the line by constraining transverse movement of the line to a range between side-walls of the housing.

Preferably, a said material guide element has a dimension along the corresponding rotation axis that is greater than that of the corresponding line guide element. Preferably, the housing tapers from extents at the axial ends of the material guide elements inwardly toward the stripping mechanism and/or line guide thereby forming a constricting aperture. The constricting aperture helps compact the material for more effective stripping. Furthermore, corners may be formed at the boundaries of the narrowest parts of the tapered element. Such a corner may act as a transverse constraint of the passage.

Preferably a chute is provided to direct stripped material from the line guide and/or stripping mechanism. The chute may form part of the housing as aforementioned or may be provided as a separate member locatable beneath, or to the rear of the line guide and stripping mechanism to receive the stripped material. As used herein, the term "chute" refers to any chute, funnel, tube, trough, shaft or the like that is capable of conveying stripped material from the line guide and or stripping mechanism.

It should be appreciated that the chute may be rigid or flexible as required. As an example, in one embodiment the chute may be formed as an elongate flexible tube that can be repositioned to alter the direction of the cut material.

Preferably, the line is fixed at either end, the apparatus being movable along the line to remove material therefrom. In an alternative embodiment, the apparatus may be held in position and the line moved therethrough.

The apparatus may be mounted to a carrier such as a tractor, harvester, truck, forklift or the like to provide means to transport the apparatus along said line. The carrier may also preferably be capable of pivoting the entire stripping apparatus about the pivot axis through 90 degrees and more preferably 180 degrees so as to allow the stripping apparatus to be inverted to operate on alternate sides of the carrier.

According to a further aspect of the present invention there is provided a method of stripping organic material from a line, said method using an apparatus substantially as hereinbefore described and including the steps of:
 positioning the line on the first or second stripping assembly on the first or second side of the line respectively,
 reconfiguring the apparatus to the closed configuration by moving the second or first stripping assembly to second or first side respectively
 moving the apparatus relative to the line while rotating the material guide elements and stripping elements to strip the organic material from the line.

Preferably, the aforementioned method includes the further step of vertically displacing said first or second stripping assembly to vertically displace the line.

The present invention may thus provide an apparatus and method that may provide significant advantages over the prior art, including a potentially more efficient and expedient method of stripping unwanted material from the line that reduces labour requirements by obviating the need to manually strip such material.

BRIEF DESCRIPTION OF DRAWINGS

Further aspects and advantages of the present invention will become apparent from the following description which is given by way of example only and with reference to the accompanying drawings in which:

FIG. 7a shows a front elevation of the apparatus of FIGS. 3-6 in the configuration shown in FIG. 4;

FIG. 7b shows a cross-section through A-A indicated on FIG. 7a;

BEST MODES FOR CARRYING OUT THE INVENTION

Figure 1:
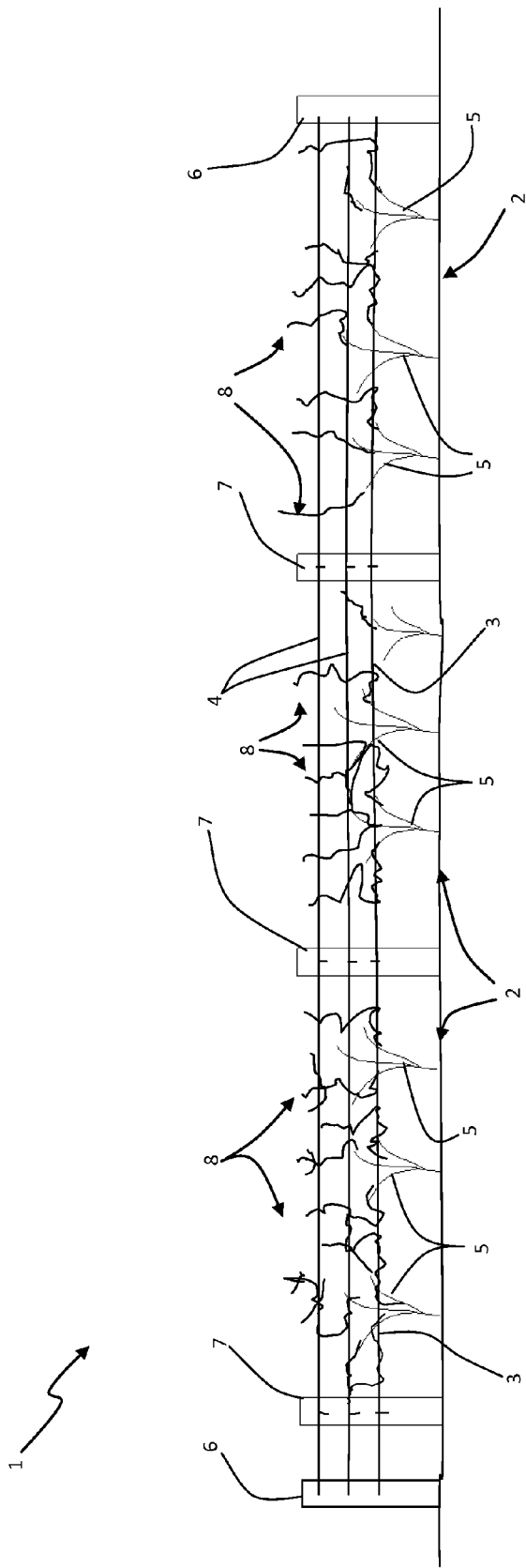
FIG. 1 shows a schematic view of a row of pruned grapevines.

FIG. 1, shows a row (1) of grapevines (2) in a typical vineyard arrangement, though of shortened length for illustrative purposes. The wires (3, 4) extend between two end posts (6) and are releasably attached to one or more intermediate posts (7) along the row of grapevines (2). The wires (3, 4) are releasably attached to the posts (7) via line retention devices provided in the form of snap-fit plastic clips although other line retention devices may also be utilised. Vines (2) are planted between the posts (7) and are attached to a fruiting wire (3). During the growing season, the canes (8) of the vines (2) are guided upwards by lifting wires (4). The canes (8) are typically attached to the wires (3, 4) with clips, vine-ties or similar. The canes (8) also grow and wrap themselves about the wires (3, 4).

After the growing season, the vines (2) must be pruned to remove all material apart from a few select canes (5) that have desirable attributes, e.g. originating from an area close to the head or crown of the vine (2), not being stunted or diseased and having a sufficient number of healthy buds. The pruned canes (8) are still attached and wrapped about the wires (3, 4) and must be removed to prevent disease and make space for new growth in the following season. Such canes (8) have in the past been manually 'stripped-out" at great labour expense. Retained vine stems (5) often remain entangled on the 'fruiting' wire (3) along with the cut canes (8) which may be on both the lifting (4) and fruiting (3) wires.

Figure 2:
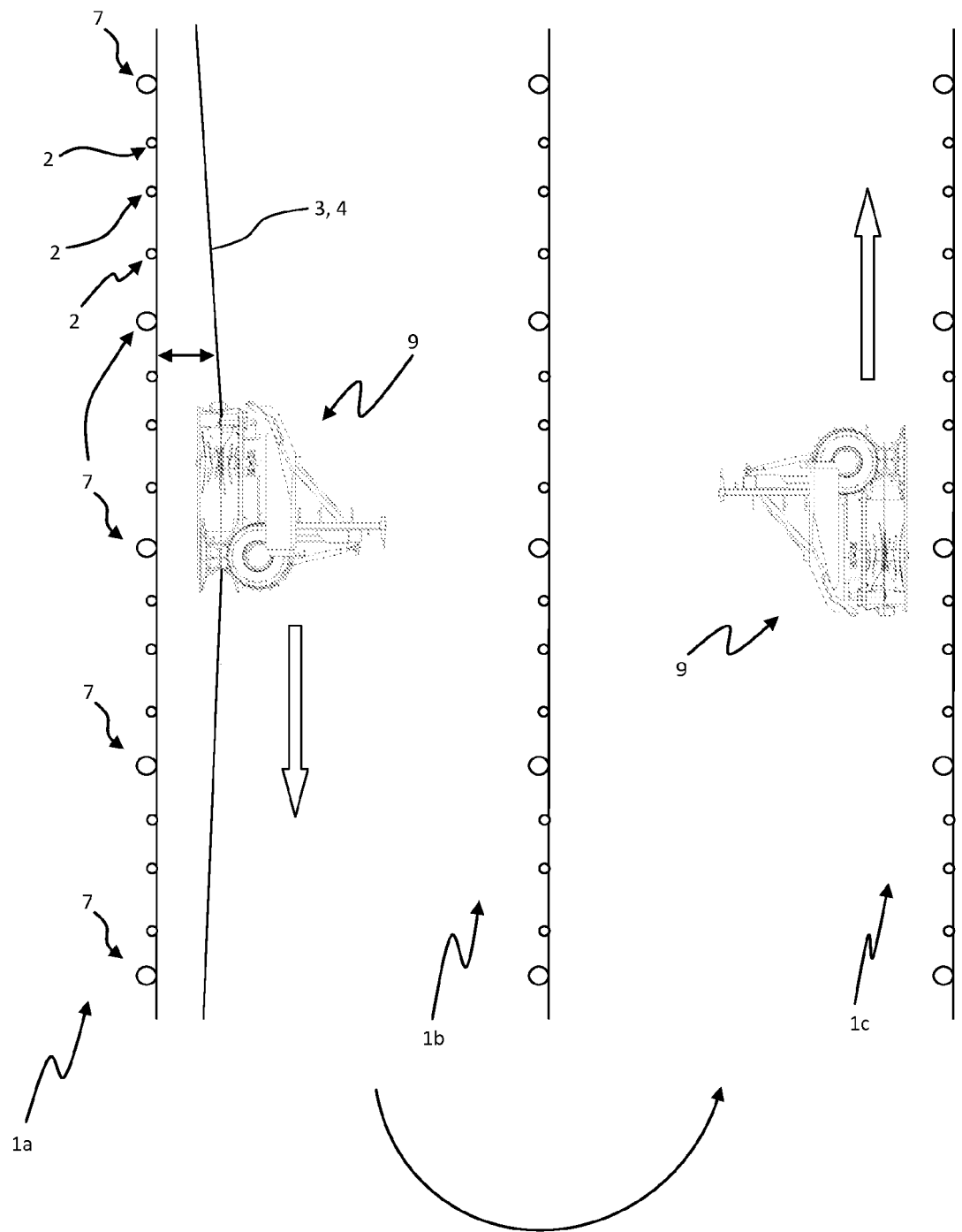
FIG. 2 shows a schematic view of a prior art stripping apparatus operating on rows of grapevines

The prior art stripping apparatus (9) by George et al and shown in FIG. 2 alleviated this labour expense by providing a carrier-mounted machine capable of lifting the wires (3, 4) and attached canes (8) away from the vines (5) to be retained. The apparatus (9) was then moved along the wires (3, 4) and its blades actuated to strip the canes (8) from the wires (3, 4). However, the wires (3, 4) are located on only one side of the posts (7) and thus, as shown in FIG. 2, when the apparatus (9) turns at the end of the row (1a) to strip the adjacent row (1b) the apparatus (9) becomes positioned on the opposite side of the posts (7) to the wires (3, 4) and therefore cannot strip the wires (3, 4). This problem has been addressed in the prior art George et al device by mounting two such stripping apparatus' (9) with one apparatus (9) on either side of the carrier so that either apparatus can be used depending on which side of the carrier the wires (3, 4) are located.

However, this method obviously incurs twice the capital cost as buying a single apparatus (9).

FIGS. 3-10 show an apparatus according to a first preferred embodiment as generally indicated by arrow (20).

The stripping apparatus (20) is for stripping irregular material from a line. In the embodiments shown in the figures, the irregular material includes the cut grapevine canes (8) shown in FIG. 1 while the line is provided as the wires (3, 4) to which the canes (8) attach as they grow. It should be appreciated that reference herein to stripping canes of a grapevine is exemplary only and should not be construed to be limiting, as the stripping apparatus (20) could be used in numerous other applications involving stripping of irregular material from a line, e.g. removing vines or other vegetation from telephone or power lines.

In use, the stripping apparatus (20) is pivotally mounted to a frame (10) that can be mounted to the 'boom' of a tractor, harvester or other carrier (not shown). The carrier boom is of adjustable height which thereby allows the apparatus (20) to be raised and lowered and moved transversally as required.

The carrier is thus able to transport the apparatus (20) alongside a row (1) of grapevines (2) and move relative to the wires (3, 4).

The apparatus (20) generally includes a material guide (50), stripping mechanism (40) and line guide (30).

The material guide (50) is configured to guide the cut canes (8) into engagement with the stripping mechanism (40) during the relative movement of the wires (3, 4) and apparatus (20). The material guide (50) includes first and second driven material guide elements respectively provided as first (50a) and second (50b) rollers with outwardly extending protrusions provided in the form of ridges (52a) and (52b) respectively.

The material guide rollers (50a, 50b) are rotatable about first (57a) and second (57b) material guide rotation axes.

The stripping mechanism (40) includes driven stripping elements provided in the form of first (40a) and second (40b) blade sets respectively connected to first (41a) and second (41b) stripping element mounting shafts that are rotatable about first (47a) and second (47b) stripping element rotation axes.

The line guide (30) includes first and second line guide elements respectively provided in the form of first (30a) and second (30b) rollers and further including first (32a) and second (32b) cross-members.

The first line guide element (30a), first stripping element (40a) and first material guide element (50a) collectively form a first stripping assembly and the second line guide element (30b), second stripping element (40b) and second material guide element (50b) collectively form a second stripping assembly.

Figure 4:
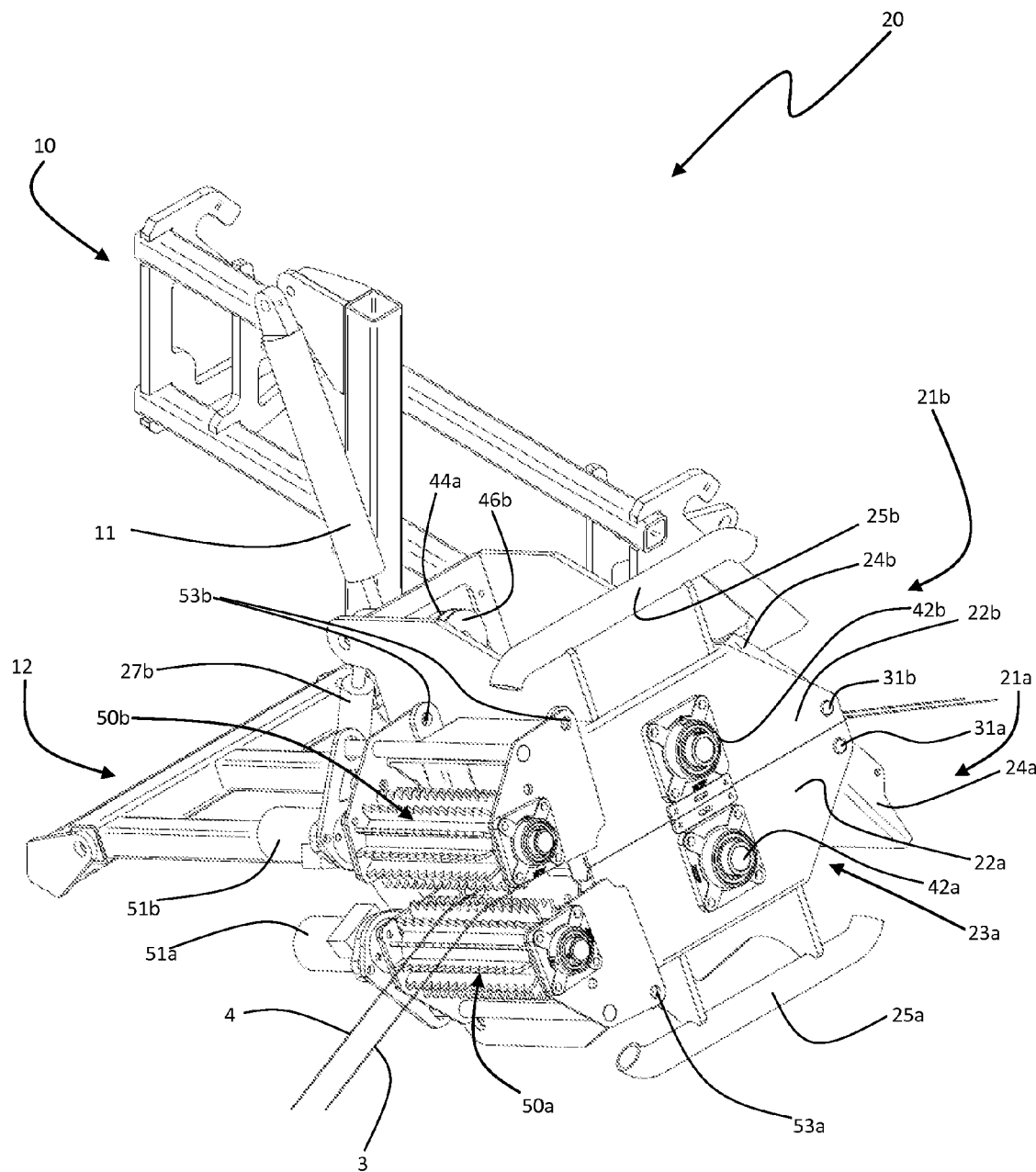
FIG. 4 shows an isometric view of the apparatus of FIG. 3 when in a closed 'open' configuration.

The wires (3, 4) pass between the stripping assemblies (30a, 40a, 50a and 30b, 40b, 50b) during stripping. The stripping assemblies (30a, 40a, 50a and 30b, 40b, 50b) as shown in FIG. 4 are orientated during stripping such that the first material guide rotation axis (57a) and the first stripping element rotation axis (47a) are on a 'first' lateral side of the wires, i.e. below wires (3, 4), while the second material guide rotation axis (57b) and the second stripping element rotation axis (47b) are on an opposing 'second' lateral side of the line i.e. above wires (3, 4).

As can be seen from the FIGS. 3-10, the stripping apparatus (20) is formed as two halves (21a, 21b), hinged together about pivot points (26) which allow the two halves to pivot toward or away from each other about a corresponding assembly pivot axis.

The first half (21a) includes the first stripping assembly with the first line guide roller (30a), first set of blades (40a), and first material guide roller (50a) while the second half (21b) includes the second stripping assembly with the second line guide roller (30b), second set of blades (40b), and second material guide roller (50b).

Each half (21a, 21b) also includes a corresponding housing portion (22a, 22b) to which the respective elements are mounted, including the line guide rollers (30a, 30b), cross-members (32a, 32b), blade sets (40a, 40b), stripping element mountings (41a, 41b) and material guide rollers (50a, 50b).

Figure 5:
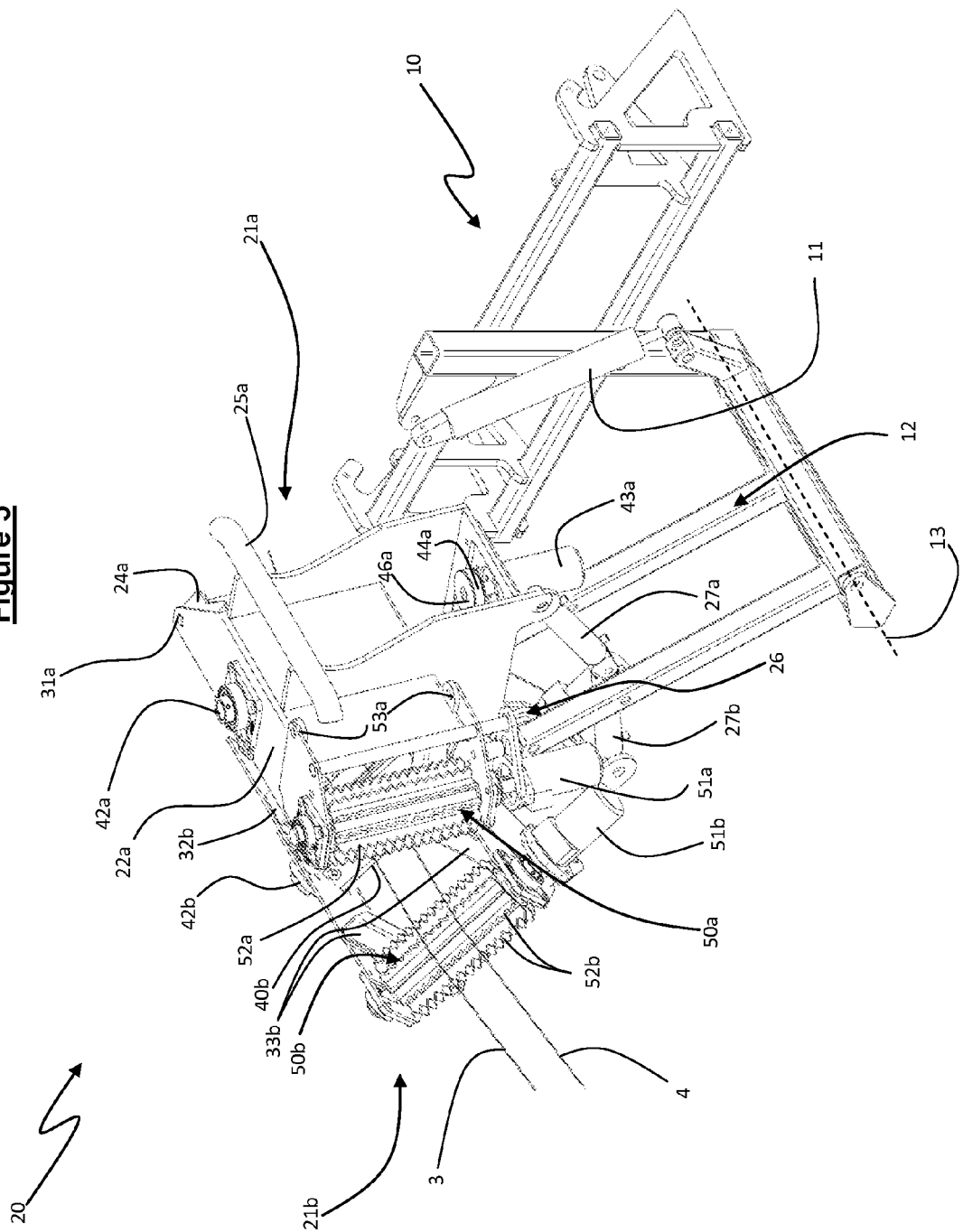
FIG. 5 shows an isometric view of the apparatus of FIGS. 3 and 4 when in the 'open' configuration and rotated to operate on an alternate side.
Figure 6:
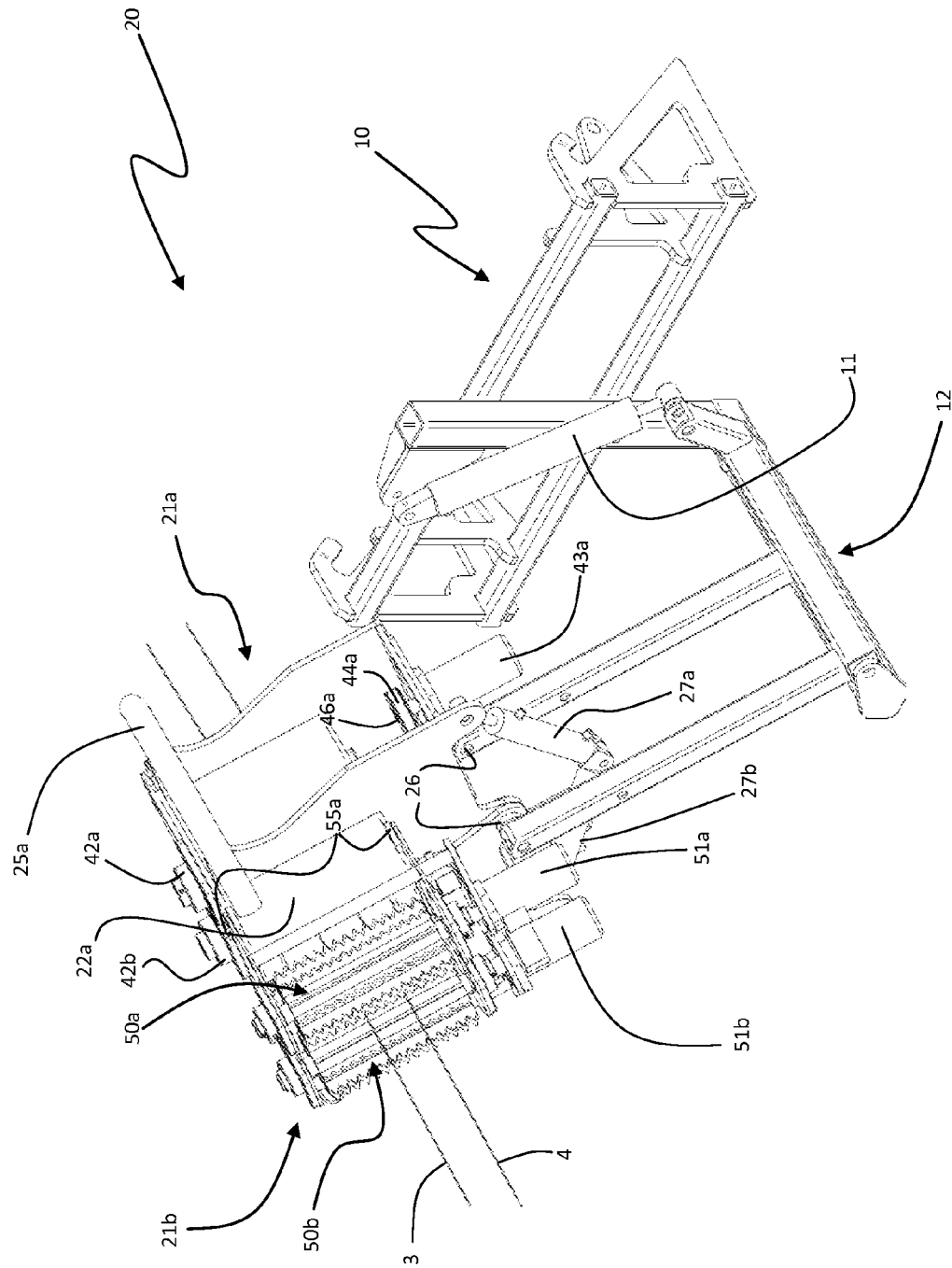
FIG. 6 shows an upper-front isometric view of the apparatus of FIG. 5 when in the closed 'open' configuration.
Figure 7:
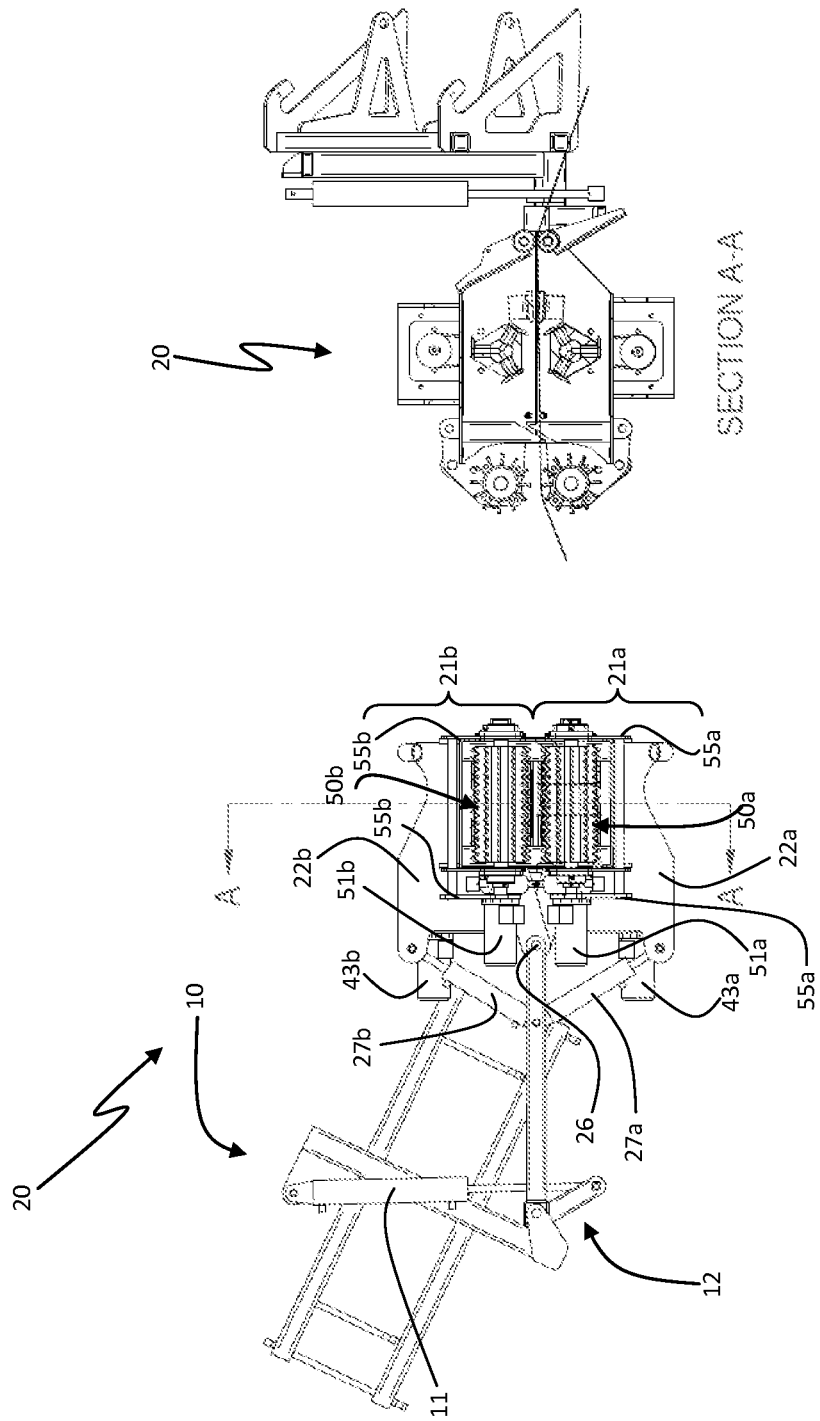

The housings (22a, 22b) also act to enclose the canes (8) as they pass through and thereby prevent the canes (8) from being ejected upwards or to the side which may interfere with the carrier, operator or deposit cut canes onto the retained vines (5). Each housing (22a, 22b) has a corresponding chute (23a, 23b) with closures formed as hinged hatches (24a, 24b), each hatch (24a, 24b) hinged to the axle (31a, 31b) of the corresponding line guide roller (30a, 30b) and capable of being opened or closed to respectively prevent or permit stripped cut canes (8) to be ejected from the rear of the apparatus (20). The lowermost hatch ((24a) in FIGS. 3 and 4 and (24b) in FIGS. 5 and 6 is open to allow the cut canes to fall to the rear of the apparatus (20). The other hatch ((24b) in FIGS. 3 and 4 and (24a) in FIGS. 5 and 6) is closed to prevent the cut canes (8) from being ejected upwards and potentially landing on the carrier or operators.

The wires (3, 4) are laterally constrained within a passage through the apparatus defined sequentially by the space between the:
- first (50a) and second (50b) material guide elements in the plane extending between the first and second material guide element rotation axes;
- first (40a) and second (40b) stripping elements in the plane extending between the first and second stripping element rotation axes;
- first (30a, 32a) and second (30b, 32b) line guide elements in the plane extending between the closest parts of the first (30a, 32a) and second (30b, 32b) line guide elements.

The wires (3, 4) are also further laterally constrained to a volume of the passage defined by the:
- first (50a) and second (50b) material guide elements in the plane extending between the first and second material guide element rotation axes;
- first (30a, 32a) and second (30b, 32b) line guide elements in the plane extending between the closest parts of the first (30a, 32a) and second (30b, 32b) line guide elements.
- transverse constraints (33a, 33b) and the interior sidewalls of the housing (22a, 22b).

The wires are thus constrained within a passage as they pass through the apparatus (20) between the stripping assemblies.

The spans between:
- the wires (3, 4), and
- both of the first (40a) and second (40b) stripping elements are unobstructed in a plane passing through the rotation axes of the stripping elements (40a, 40b) so that the blades (40a, 40b) can cut as close as possible to the wires (3, 4) without encountering an obstruction. The blades (40a, 40b) are unable to contact the wires (3, 4) as the wires (3, 4) are constrained to the volumetric passage defined above. This configuration ensures maximum stripping effectiveness while also protecting the wires (3, 4) from damage.

The two stripping assemblies (21a, 21b) are generally mirror images of each other and throughout this description the reference numerals of components of the first stripping assembly (21a) will have a suffix "a" while those numerals referencing components on the second stripping assembly (21b) will have a suffix "b".

Figure 3:
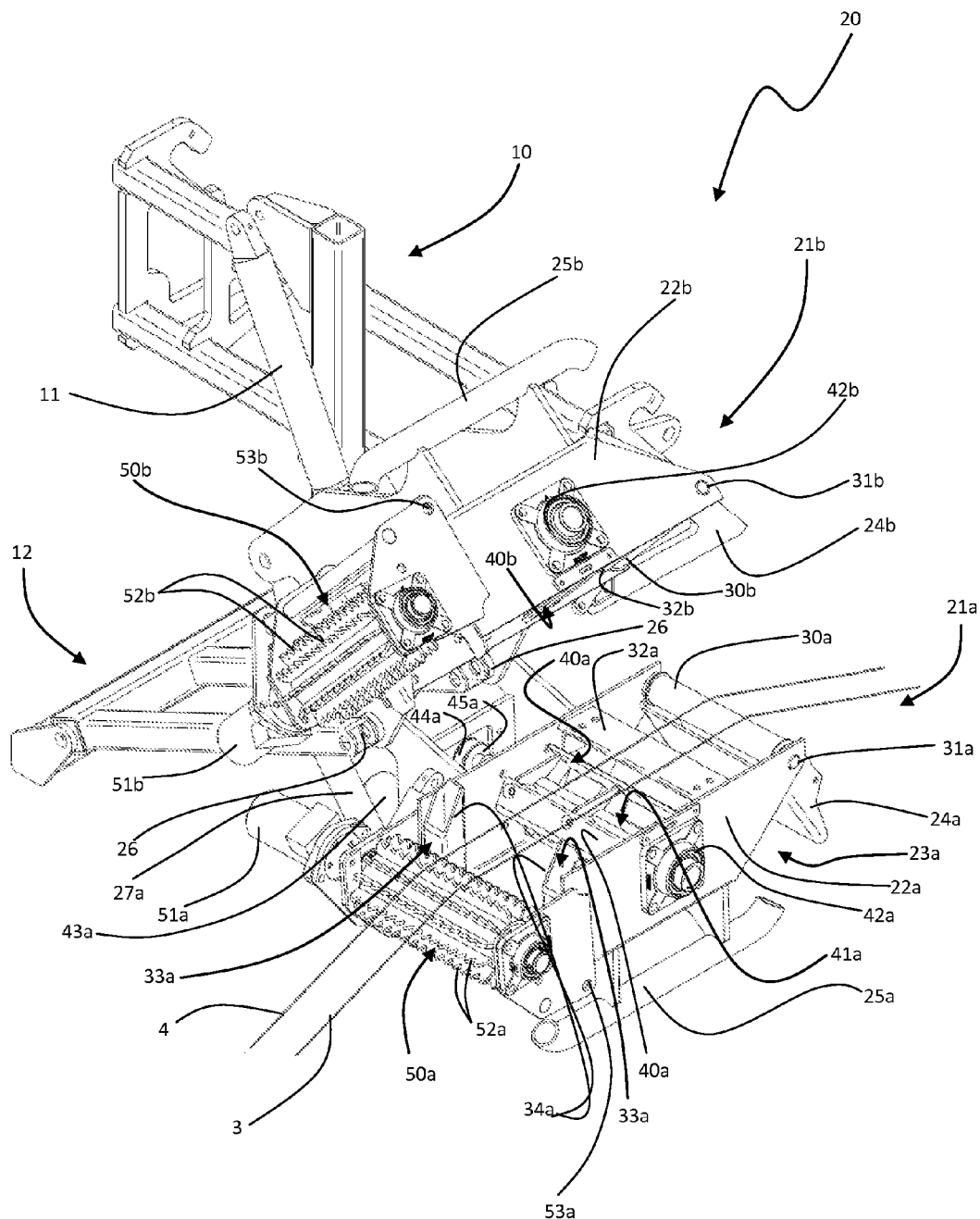
FIG. 3 shows an isometric view of an apparatus according to a first preferred embodiment of the present invention when in an 'open' configuration.

Such a symmetrical stripping apparatus (20) can thus be inverted while still operating effectively and it is thereby possible for a single apparatus (20) to be used to strip on both sides of a carrier. As is shown in FIGS. 3 and 4 the apparatus (20) may operate on the left side of the carrier, while FIGS. 5 and 6 shows the apparatus (20) 'inverted' to operate on the right hand side of the carrier. In either orientation, the wires (3, 4) will be supported by a line guide roller (30a or 30b) and material guide roller (50a or 50b).

Tubular skids (25a, 25b) are provided on the housings (22a, 22b) to support the stripping apparatus (20) when resting on the ground.

The two stripping assemblies (21a, 21b) are hinged together along one side at the mutual couplings (26) of the housings (22a, 22b) to a pivoting attachment (12) to the carrier frame (10).

The two stripping assemblies (21a, 21b) can thereby be moved together from an open configuration as shown in FIGS. 3 and 5 to a closed configuration as shown in FIGS. 4 and 6-10. The apparatus (20) is moved between the open and closed configurations through actuation of one or both of a pair of hydraulic rams (27a, 27b).

In the closed configuration the first set of blades (40a) first hub (41a), first line guide roller (30a) and first material guide roller (50a) are located in a confronting relationship to the second set of blades (40b), second hub (41b), second line guide roller (50b) and second material guide roller (50b). The stripping assemblies (21a, 31b) are thus on opposite sides of the wires (3, 4).

The line guide rollers (30a, 30b) have the primary function of supporting and guiding the wires (3, 4) through the apparatus (20) between the blades (40a, 40b) such that the wires (3, 4) are not damaged by the blades (40a, 40b). The line guide rollers (30a, 30b) are preferably formed from steel, nylon or synthetic rubber, though other materials can be used. The construction material could also include a low-friction or high-friction coating depending on the application and operating environment.

The line guide rollers (30a, 30b) are mounted via axles (31a, 31b) and suitable bearings (internal and not shown) to a corresponding housing (22a, 22b) which allows the line guide rollers (30a, 30b) to rotate freely from the frictional contact with the wires (3, 4).

The line guide rollers (30a, 30b) have different axes of rotation that are non-coaxial in both open and closed positions and generally parallel when the apparatus (20) is in the closed position.

The line guide also includes first (32a) and second (32b) support plates mounted to the corresponding first (22a) and second (22b) housings. The support plates (32a, 32b) are located in front of (with respect to direction of relative line movement) the line guide rollers (30a, 30b). These support plates (32a, 32b) help to prevent the wires (3, 4) from contacting with the blades (40a, 40b) of the stripping mechanism if the wires (3, 4) are pulled toward the blades (40a, 40b) and also allow the blades (40a, 40b) to cut as close as possible to the wires (3, 4) without contacting the wires (3, 4).

In some applications, the line guide rollers (30a, 30b) may not be required as the support plates (32a, 32b) and corresponding material guide rollers (50a, 50b) may be sufficient to support and guide the line between the blades (40a, 40b). Thus, in such an embodiment the line guide is formed by the support plates (32a, 32b). It will thus be appreciated that according to different embodiments, the line guide may be composed of individual or multiple line guide elements.

The support plates (32a, 32b) are preferably constructed from Teflon®-coated steel or similar low-friction, hard-wearing material to reduce wire abrasion and resistance to line movement. The support plates (32a, 32b) may also act to contact and halt or strip any irregular material (2) that is not cut and stripped by the blades (40a, 40b).

It should be appreciated that the wires (3, 4) are not necessarily in contact with the support plates (32a, 32b) throughout the stripping operation as the wires (3, 4) are primarily supported by both a line guide roller (30a or 30b) and a material guide roller (50a, 50b). The wires (3, 4) will thus always be supported by at least two points of contact and potentially three points of contact. For each stripping assembly (21a, 21b), the corresponding line guide roller (30a, 30b) has a rotation axis parallel to the rotation axes of the material guide roller (50a, 50b) and blade hub (41a, 41b).

The line guide rollers (30a, 30b) and support plates (32a, 32b) extend across the width of the corresponding housings (22a, 22b) and so provide a continuous surface for the wires (3, 4) to be supported on, while at the same time allowing the wires (3, 4) to move laterally along the rollers (30a, 30b).

The prior art apparatus (9) shown in FIG. 2 has a line guide formed as a rigid channel though which the wire was supported. The prior art channel was required to constrain the wire in three mutually orthogonal directions to not only support the wire as it was lifted and pulled away from the grapevine row but also to prevent the wires from being cut by the blades which cut in planes either side of the wire parallel to the transverse line tension caused by the movement of the wire away from the grapevine row. However, weak wire travelling through the prior art channel was prone to being snapped or damaged. As the channel was relatively narrow, the wire and could bend about the terminal ends of the channel due to lateral line tension. A larger channel may solve this problem but would result in blades cutting further from the wire and therefore cutting less effectively. Similarly, the prior art channel may have problems in accommodating multiple wires.

In contrast, the present apparatus (20) has blades (40a, 40b) that cut either side of the wires (3, 4) through planes that are perpendicular to the direction of this transverse line tension and so will not cut the wires (3, 4) even when moving over the length of the line guide rollers (30a, 30b) and support plates (32a, 32b). This line guide configuration results in an apparatus (20) that is thus capable of stripping multiple wires and/or weak wires that would otherwise be damaged by the prior art stripping apparatus (9).

The stripping mechanism generally includes the first (40a) and second (40b) sets of blades and the respective first (41a) and second (41b) mounting hubs that are rotatably connected to the corresponding housings (22a, 22b) via hub mountings (42a, 42b). Each hub (41a, 41b) is connected to a corresponding hydraulic motor (43a, 43b) via a drive belt (44a, 44b) that extends from a hub drive wheel (45a, 45b) to a larger diameter motor drive wheel (46a, 46b) on the motor's (43a, 43b) output shaft. Such a drive wheel and belt arrangement provides a higher blade hub rotational speed than that provided by the hydraulic motor shaft speed.

It should be appreciated that the wheel and belt arrangement could be supplanted by a gear set or, in an alternative embodiment, sufficiently high-speed hydraulic motors could be directly coupled to the blade hubs (41a, 41b).

The hydraulic motors (43, 51) may be powered by the PTO or hydraulics of a carrier or alternatively a separate generator (s) may be provided. It will be appreciated however that other types of motor or motive means may be used and reference herein to hydraulic motors is exemplary only.

Figure 8:
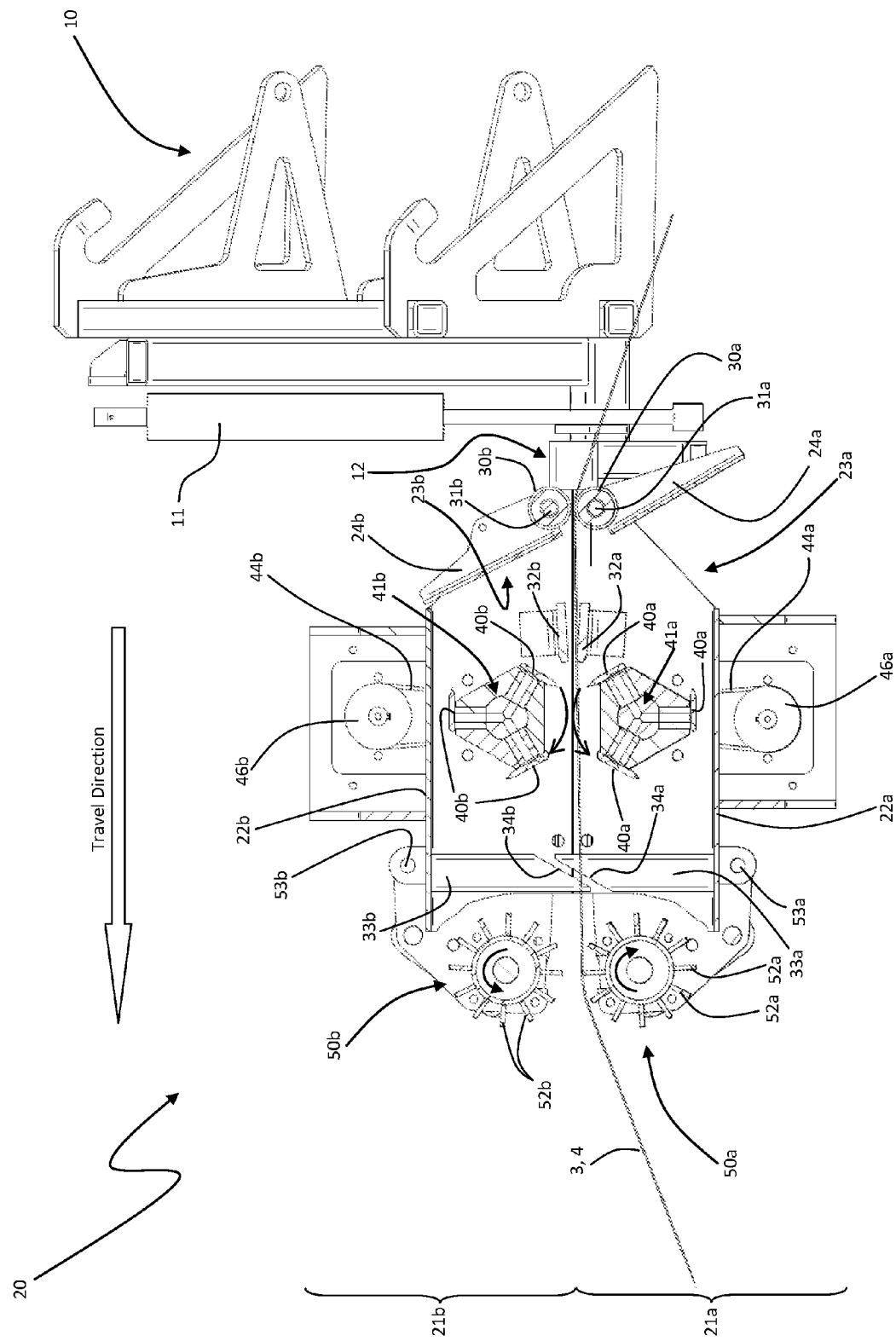
FIG. 8 shows an enlarged FIG. 7b.
Figure 9:
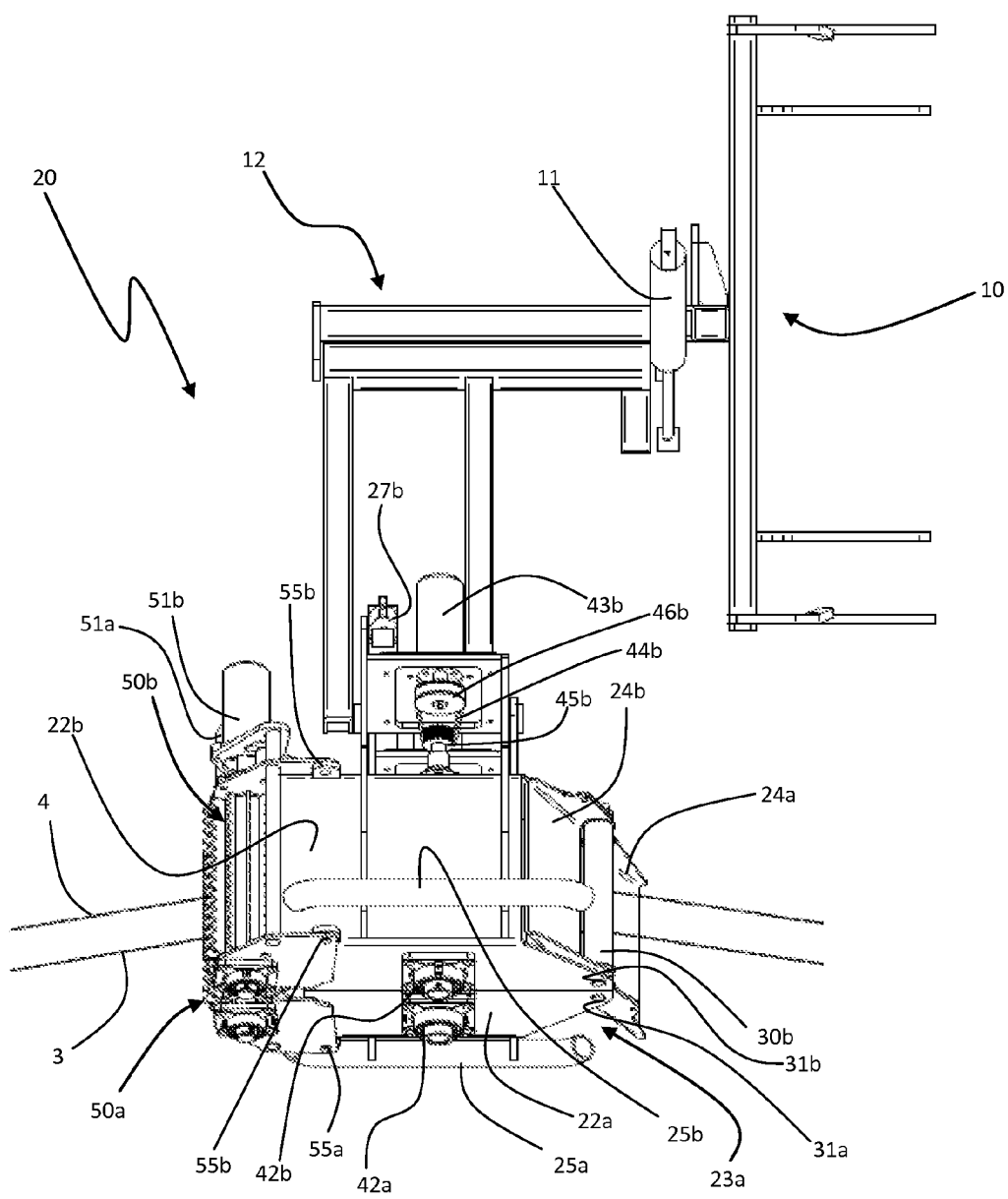
FIG. 9 shows a plan view of the apparatus of FIGS. 3-8.

The blades (40a, 40b) can thus be actuated to rotate at high speed with respect to the wires (3, 4), line guide rollers (30a, 30b) and material guide rollers (50a, 50b) such that the blades (40a, 40b) circumscribe arcs on either side of the wires (3, 4). As shown in FIG. 8, the blade hubs (41a, 41b) are contra-rotatable with the first hub (41a) rotating anticlockwise with respect to the page while the second hub (41b) rotates clockwise. The blades (40a, 40b) thus move such that when closest to the wires (3, 4) they have a tangential velocity vector orientated in an opposing direction to the wire movement through the apparatus (20).

The two blade hubs (41a, 41b) have different axes of rotation that are non-coaxial in both open and closed positions and generally parallel when the apparatus (20) is in the closed position, though it will be appreciated that the blades (40a, 40b) will still cut and strip the canes (8) to a lesser extent if their corresponding hub axes are not parallel.

The blades (40a, 40b) have a sharpened leading edge that extends along the length of the corresponding hub (41a, 41b) and the hub rotation axes are orientated perpendicular to the wires (3, 4). Thus the blades (40a, 40b) are able to cut through a continuous space across the entire width of the corresponding housing (22a, 22b) on either side of the wires (3, 4). Such a blade configuration ensures optimal cutting as the blades cut through an area approximately equal to almost the entire circumference of the wires (3, 4) and across the entire width of the housing (22a, 22b), i.e. only the area immediately adjacent the wires (3, 4) between the blades (40a and 40b) is not directly cut. In contrast, the prior art apparatus (9) used spaced blades cutting through arcs in planes parallel to the wires (3, 4), thereby resulting in a smaller total area cut. The present stripping apparatus' (20) configuration of transversely extending parallel blades (40a, 40b) on either side of the wires (3, 4) provides improved cutting ability, particularly on larger, harder (e.g. older) canes (8) that may be tightly wrapped about the wires (3, 4) and therefore require close cutting of the wires (3, 4).

It should be appreciated that the blades (40a, 40b) need not have a continuous straight edge and could be configured in numerous ways while still cutting effectively, e.g. a blade leading edge could be tapered, undulating and/or serrated but still extending along the length of the corresponding hub (41a, 41b). The blade shape may thus be set to provide optimum stripping capability for a particular application. In some applications, e.g. mollusc stripping from cables, it may be useful to have blades with blunt edges.

The material guide's primary function is to vertically displace and guide the canes (8) on the wires (3, 4) into engagement with the stripping mechanism blades (40a, 40b). The lowermost material guide roller (50a or 50b depending on orientation) in conjunction with the line guide rollers (30a, 30b) and support plates (32a, 32b) also supports the wires (3, 4) in a plane between the blades' (40a, 40b) cutting volumes.

The material guide rollers (50a, 50b) are located in front (in use) of the line guide rollers (30a, 30b) and stripping mechanism blades (40a, 40b) and act to pull, vertically displace, compact and re-orientate the canes (8) into engagement with the blades (40a, 40b) of the stripping mechanism.

The material guide rollers (50a, 50b) vertically displace the canes (8) by presenting a forward-most rotating arcuate surface which contacts the canes (8) and moves them vertically.

There are twelve ridges (52) provided on each roller (50a, 50b) in the first embodiment shown in FIGS. 3-10 and each ridge (52) has a series of wedge-shaped serrations that assist in gripping the cut canes (8).

The teeth (52a, 52b) on the material guide rollers (50a, 50b) help to grip the cut canes (8) and push them upwards and away from the retained vines (5) with which the cut canes (8) may be entangled. The vertical displacement thus helps to separate the cut canes (8) from the retained vines (5) by vertically displacing them upwards. In the embodiment shown in the drawings, the grapevine rows (1) have an upright trellis arrangement. It should be appreciated that in a hanging trellis arrangement the vertical displacement caused by the material guide rollers (50a, 50b) would be downwards. FIG.

13 shows an alternative embodiment (described in more detail below) in the closed configuration, where the material guide rollers (50a, 50b) are close enough such that the teeth (52a, 52b) of each stripping assembly (21a, 21b) intersect each other.

The vertical displacement as the cut canes (8) are pulled from the retained vines (5) minimises damage to the retained vines (5). Pulling the cut canes (8) at least partially vertically (which is along the predominant direction of growth), as opposed to a solely or predominantly lateral direction avoids snapping or other damage of the retained vines (5).

The material guide also includes first (53a) and second (53b) pairs of lateral guides. The first lateral guides (53a) have bevelled ends (54a) that abut corresponding bevelled ends (54b) of the second lateral guides (53b) when the first (21a) and second (21b) stripping assemblies are moved to the closed configuration. The first (53a) and second (53b) lateral guides thus prevent the wires (3, 4) from moving to the ends of the material guide rollers (50a, 50b) and potentially jamming or being damaged. The lateral guides (53a, 53b) also act to funnel the cut canes (8) toward the blades (40a, 40b).

Such lateral guides may also help align the wires (3, 4) with the line guide (200) and minimise the extent of possible lateral movement of the wires (3, 4) over the material guide rollers (50a, 50b).

As shown in FIG. 8, the material guide rollers (50a, 50b) are both contra-rotatable with the lowermost roller (50a) rotating clockwise with respect to the page while the upper roller (50b) rotates anticlockwise. The material guide rollers (50a, 50b) are respectively directly driven by hydraulic motors (51a, 51b). However, as with the blade hubs (41a, 41b) the material guide rollers (50a, 50b) could be driven via a gearing arrangement or other mechanism.

The rotating material guide rollers (50a, 50b) act to grip and vertically displace the canes (8) and then to form a compacted bundle of canes (8) that are then ejected toward the blades (40a, 40b). Without such a material guide, the irregularly arranged canes (8) are likely to bunch, be stripped prematurely or may not be cut effectively.

In some operations, the canes (8) may bunch and twist as they enter the material guide rollers (50a, 50b) to such an extent as to potentially block the material guide and/or jam the wires (3, 4). To alleviate this problem, the material guide rollers (50a, 50b) are hinged at couplings (55a, 55b) to a corresponding housing (22a, 22b) of the apparatus (20) and so can pivot away from each other if a large bunch of cut canes (8) is encountered that forces the material guide rollers (50a, 50b) apart.

The material guide rollers (50a, 50b) shown in FIGS. 3-10 pivot about the couplings (55a, 55b) under the force imparted by cut canes (8) between the material guide rollers (50a, 50b). However, it should be appreciated that a pair of hydraulic rams or the like could be mounted to pivot the material guide rollers (50a, 50b) and a force transducer or other mechanism provided to monitor the relative forces on the material guide rollers (50a, 50b) as canes (8) pass through. Where the forces detected by the transducer exceed a set threshold, control circuitry may be configured to automatically actuate the hydraulic rams to increase the spacing between the material guide rollers (50a, 50b) to allow the bunch of canes (8) through.

The frame (10) is capable of being picked up by a tractor boom with a standard "euro-hitch" or similar attachment. It should be appreciated that the frame required will depend on the carrier configuration and the example frame shown in the drawings should not be seen to be limiting.

The frame (10) is however required to be capable of pivoting the stripping apparatus (20) to invert from a 'left-side' orientation (see FIGS. 3, 4 and 7-9) with the first stripping assembly (21a) underneath the second stripping assembly (21b) to a 'right-side' orientation (see FIGS. 5 and 6) with the second stripping assembly (21b) underneath the first stripping assembly (21a). The stripping apparatus (20) is pivotally mounted to the frame (10) via a pivoting attachment (12) that can be pivoted relative to the frame (10) via actuation of a hydraulic ram (11). When the ram (11) is extended as shown in FIGS. 3-4 and 7-9, the apparatus (20) is in the left-side orientation whereas if the ram (11) is retracted the stripping apparatus (20) is pivoted to the right-side orientation as shown in FIGS. 5 and 6. It will be appreciated that other pivoting mechanisms could also be use to invert the stripping apparatus (20).

Figure 11:
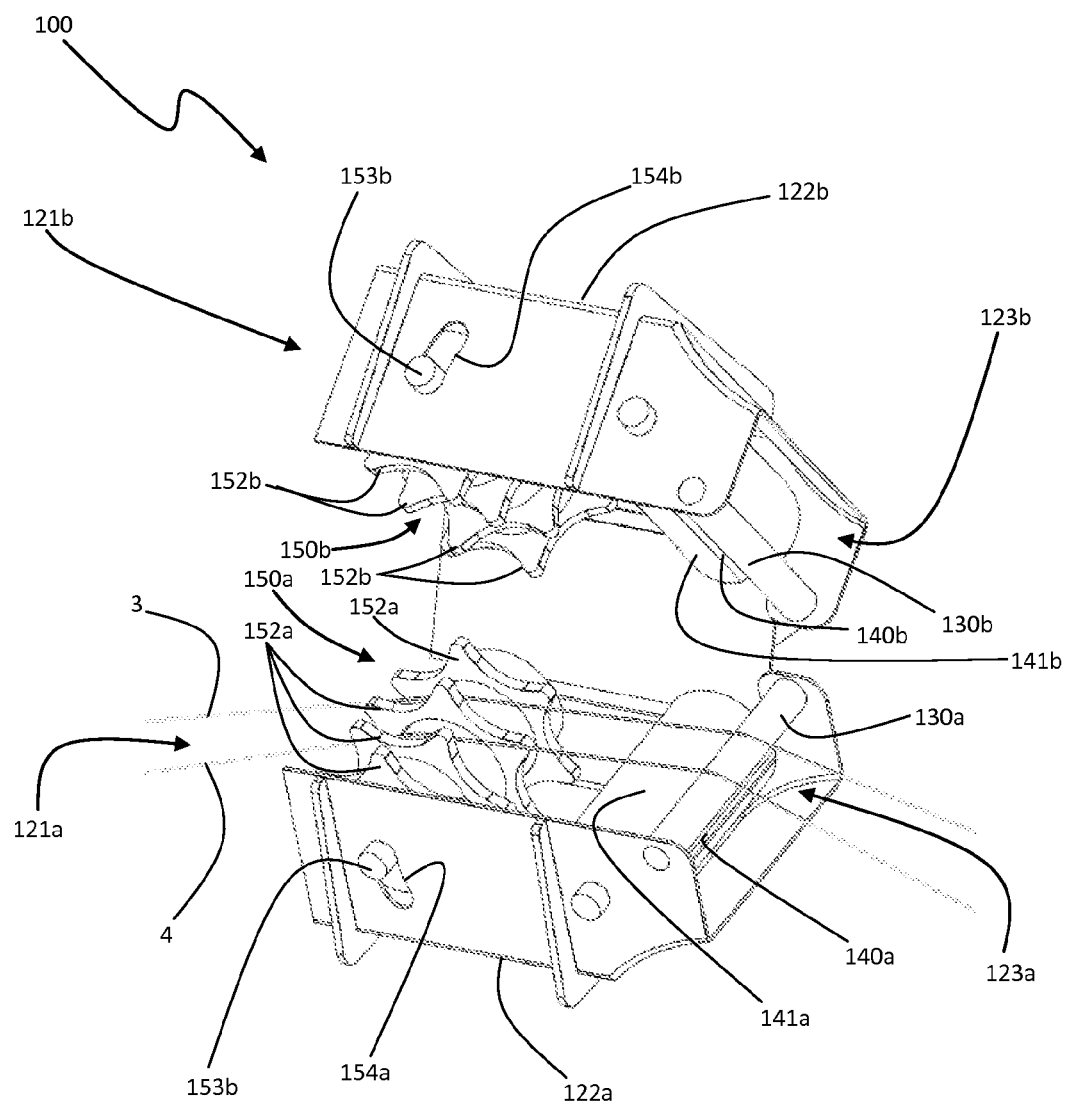
FIG. 11 shows an isometric view of an apparatus according to a second preferred embodiment of the present invention when in an 'open' configuration.
Figure 12:
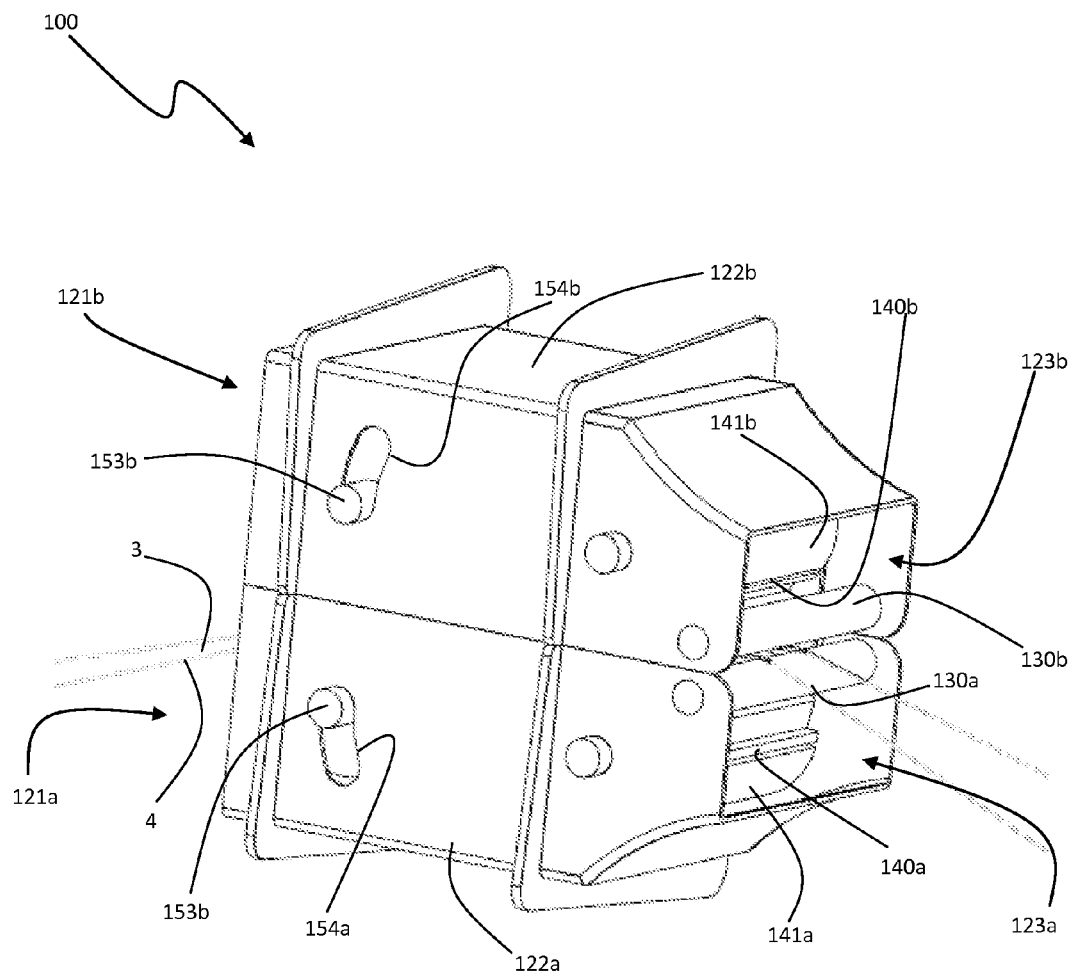
FIG. 12 shows an isometric view of the apparatus of FIG. 11 when in a closed configuration.

A second embodiment of a stripping apparatus (100) is shown in FIGS. 11 and 12 in the open and closed configurations respectively. This embodiment (100) is simplified but generally similar to the first embodiment (20) and thus like parts are labelled similarly. This stripping apparatus (100) also has a first (121a) and second (121b) stripping assemblies each having a corresponding housing (122a, 122b), chute (123a, 123b) line guide roller (130a, 130b), material guide roller (150a, 150b) with teeth (152a, 152b) and rotating hub (141a, 141b) with blades (140a, 140b) mounted thereto. The material guide rollers (150a, 150b) are mounted to the housings (122a, 122b) via axles (155a, 155b) in slots (156a, 156b) so that they are capable of moving apart, e.g. if a large bunch of canes (8) enter the apparatus (100).

Figure 13:
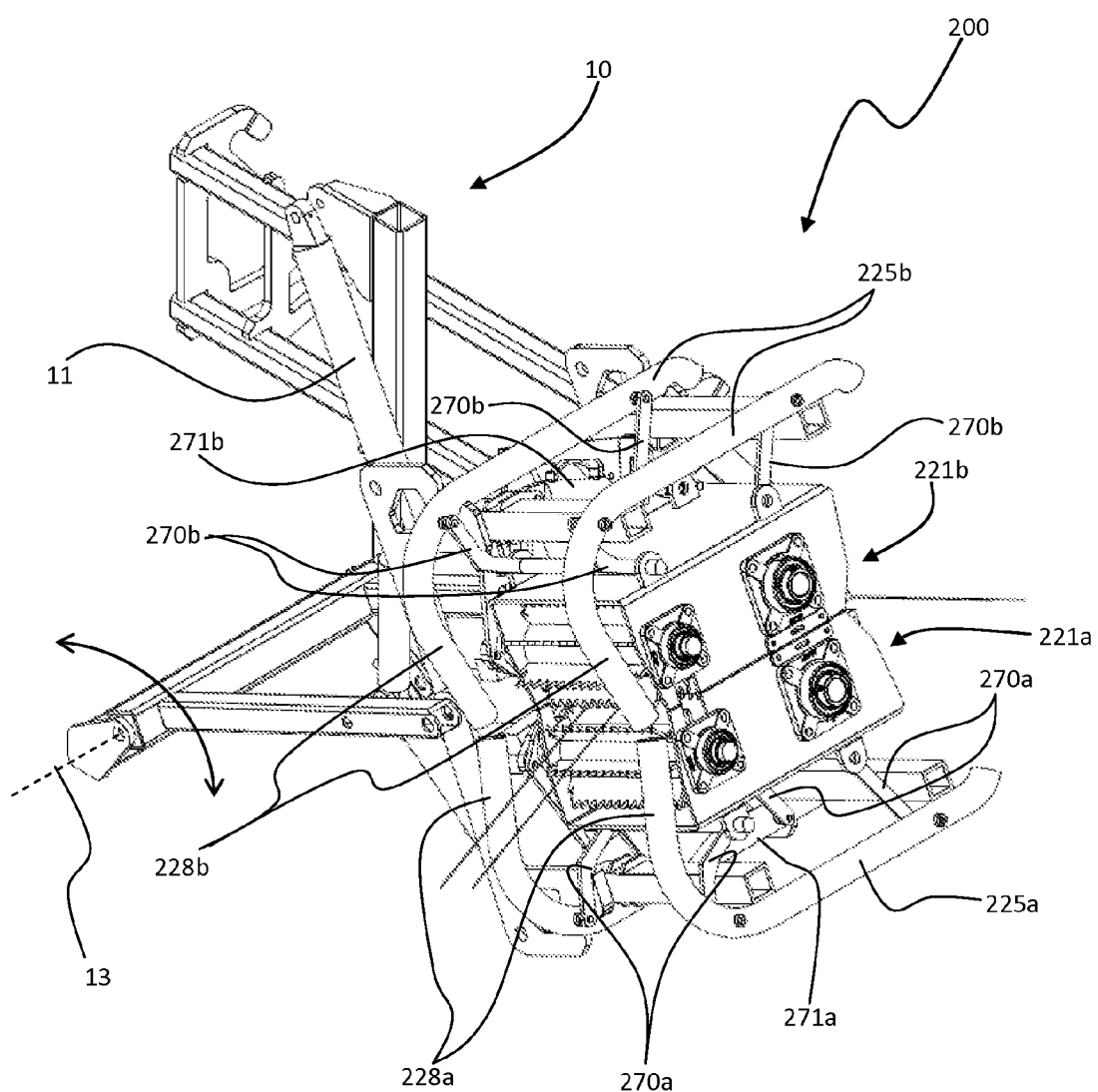
FIG. 13 shows an isometric view of an apparatus according to a third preferred embodiment of the present invention when in a 'closed configuration.
Figure 14:
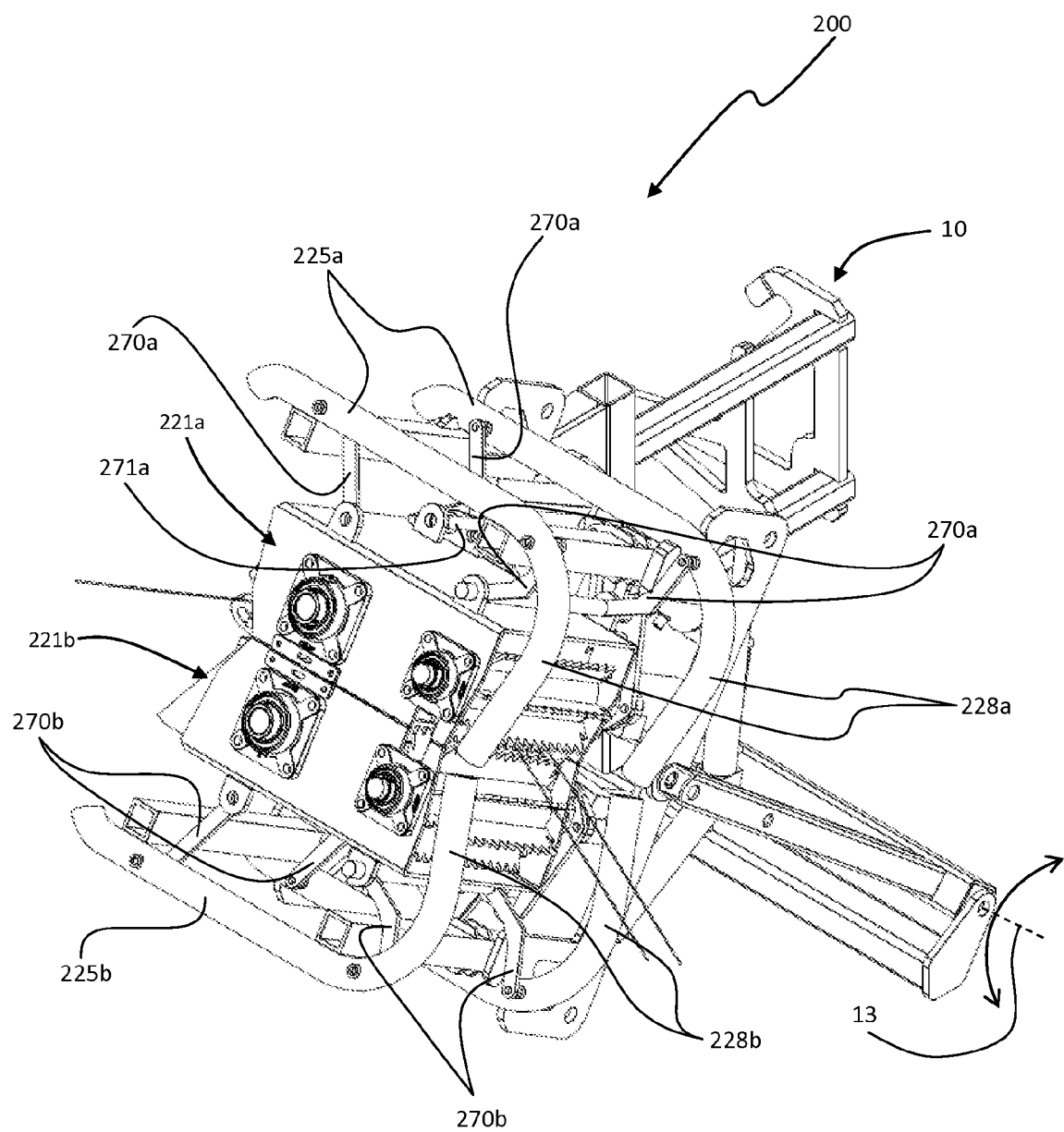
FIG. 14 shows an isometric view of the apparatus of FIG. 13 when in the 'closed' configuration and rotated to operate on an alternate side.
Figure 15:
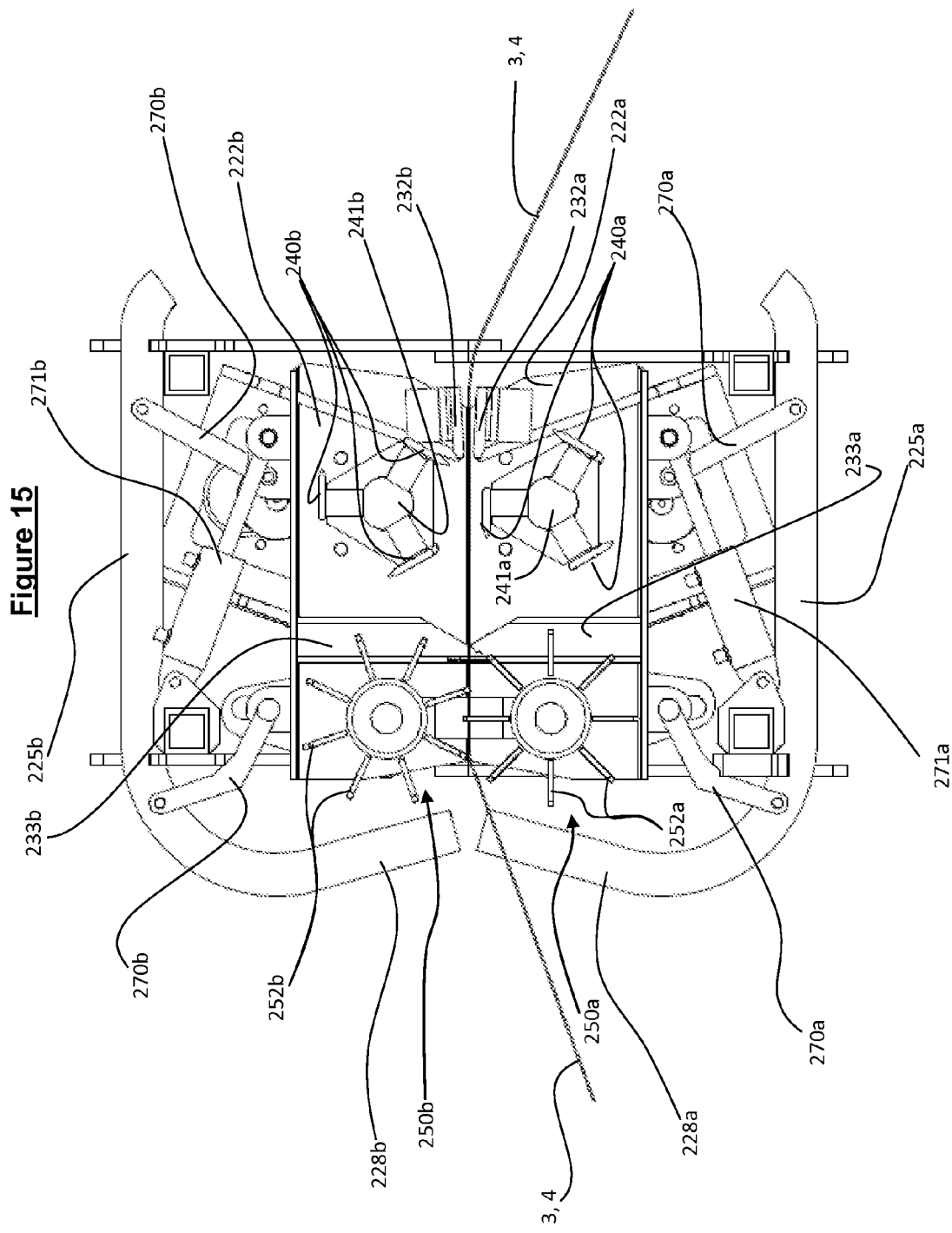
FIG. 15 shows a cross-sectional side view of an apparatus according to a forth preferred embodiment of the present invention.

FIGS. 13-15 show an apparatus (200) according to another alternative embodiment. The apparatus (200) is similar in most respects to the apparatus (20) and consequently, only the salient differences are detailed herein.

The transverse constraints may instead, or in addition to constraints (33a, 33b), be formed by providing two longer skids (225a), one on either lateral side of the first half (221a) and similarly, a second pair of skids (25b) formed on the second half (221b). The apparatus (200) has longer skids (225a, 225b) which extend forward and upwards in front of the apparatus (200) to form transverse constraints (228a, 228b) in front of the material guide rollers (250a, 250b) and adjacent to the axial ends of the material guide rollers (250a, 250b). The opposing transverse constraints (228a, 228b) also preferably mate together or interlock with one end of one of the constraints (228a) or (228b) being inserted into an end aperture of the opposing constraint (228b) or (228a) respectively. The forward transverse constraints (228a, 228b) thereby form continuous transverse constraints that extend substantially perpendicular to the material guide roller's (250a, 250b) rotation axes.

The transverse constraints (228a, 228b) ensure that the wires (3, 4) are unable to exit the passage and thus partially define the passage through the apparatus (200). Further transverse constraints (not shown) may also be formed behind the line guide cross-members (232a, 232b) adjacent to the ends thereof. In such an embodiment the intermediate transverse constraints (33a, 33b) may no longer be needed as there will be transverse constraints at the front and rear of the apparatus (200).

The apparatus (200) has a compacted line guide formed solely from the cross-members (232a, 232b) and excludes with the rollers (30a, 30b) of the first embodiment apparatus (20). The material guide rollers (250a, 250b), blade-set (240a, 240b) and cross-members (230a, 230b) are also located in greater proximity longitudinally than the first embodiment apparatus (20) and are preferably immediately proximal to each other with no intervening obstructions. A significantly compaction of the apparatus (200) is thereby achieved in comparison to the first embodiment. Stripping may also be improved as the material guide rollers (250a, 250b), blade-set (240a, 240b) and cross-members (230a, 230b) are close enough to each other to reduce the likelihood of interference from a build up of material therebetween. In preferred embodiments the blades (240a, 240b) cut as close to the corresponding cross-members (232a, 232b) as possible without contacting the cross-members (232a, 232b). Consequently, the opposite sides of the cross-members (232a, 232b) to the passage are bevelled, curved or angled to align with the arc swept by the blades (240a, 240b) as they move past, thereby minimising the open space therebetween.

In an alternative embodiment (not shown) the line guide cross-members (32a, 32b) have a substantially triangular transverse cross-section with a side of the triangular section orientated adjacent the closest arc swept by the corresponding blade set (40a, 40b) and another side orientated roughly parallel with the line.

As shown most clearly in longitudinal section view FIG. 15, the rollers (250a, 250b) are configured with outwardly extending ridges (252a, 252b) that are interspersed during rotation so that each ridge (252a) will extend outwardly from the roller (250a) toward the opposing roller (250b) but between two successive ridges 252b) of the opposing roller (250b). The ridges (50a, 50b) are thus spaced so that at any point in time only one ridge (250a or 250b) extends between the rollers (250a, 250b) in a plane passing through the rotation axes of both rollers (250a, 250b). This configuration helps prevent jamming of material between ridges (50a, 50b) orientated to directly oppose each other in the same plane.

The embodiment of FIGS. 13-15 is also capable of being re-orientated in the same manner as the first and second embodiments (20, 100) and two different exemplary orientations are shown in FIGS. 13 and 14 respectively. As previously described, the apparatus (200) is capable of being re-orientated about the pivot axis (13) at least through 60-120 degrees.

As shown most clearly in FIG. 15, the third embodiment (200) also includes two separation mechanisms each having four linkages (270a, 270b) that respectively pivotally connect each half (221a, 221b) to the corresponding skids (225a, 225b). The separation mechanisms also have a corresponding hydraulic ram (271a, 271b) that is capable of pivoting the corresponding half (221a) or (221b) by retracting or extending. When a ram (271a, 271b) is extended as shown in FIG. 15 the corresponding linkages (270a, 270b) are pivoted about their connections to force the two halves (221a, 221b) together. One or both rams (271a, 271b) can also be retracted to pivot the linkages in the opposite directions such that the rear parts of the halves (221a, 221b) are moved apart to increase the separation between the line guide cross-members (232a, 232b) and thereby increase the passage volume. The separation mechanism may assist in accommodating oversized clumps of material, or clearing any cut canes/other material that has built up in front of, or between, the line guide cross-members (232a, 232b).

The separation mechanism is preferably triggered to actuate by circuitry or mechanical actuators that are connected to a force sensor or switch (not shown) that is capable of measuring the loading on a cross-member (232a, 232b), preferably in the direction parallel to the line. Thus, the separation mechanism may be automatically controlled to increase the passage volume to help clear any blockages at the line guide (230).

Figure 16:
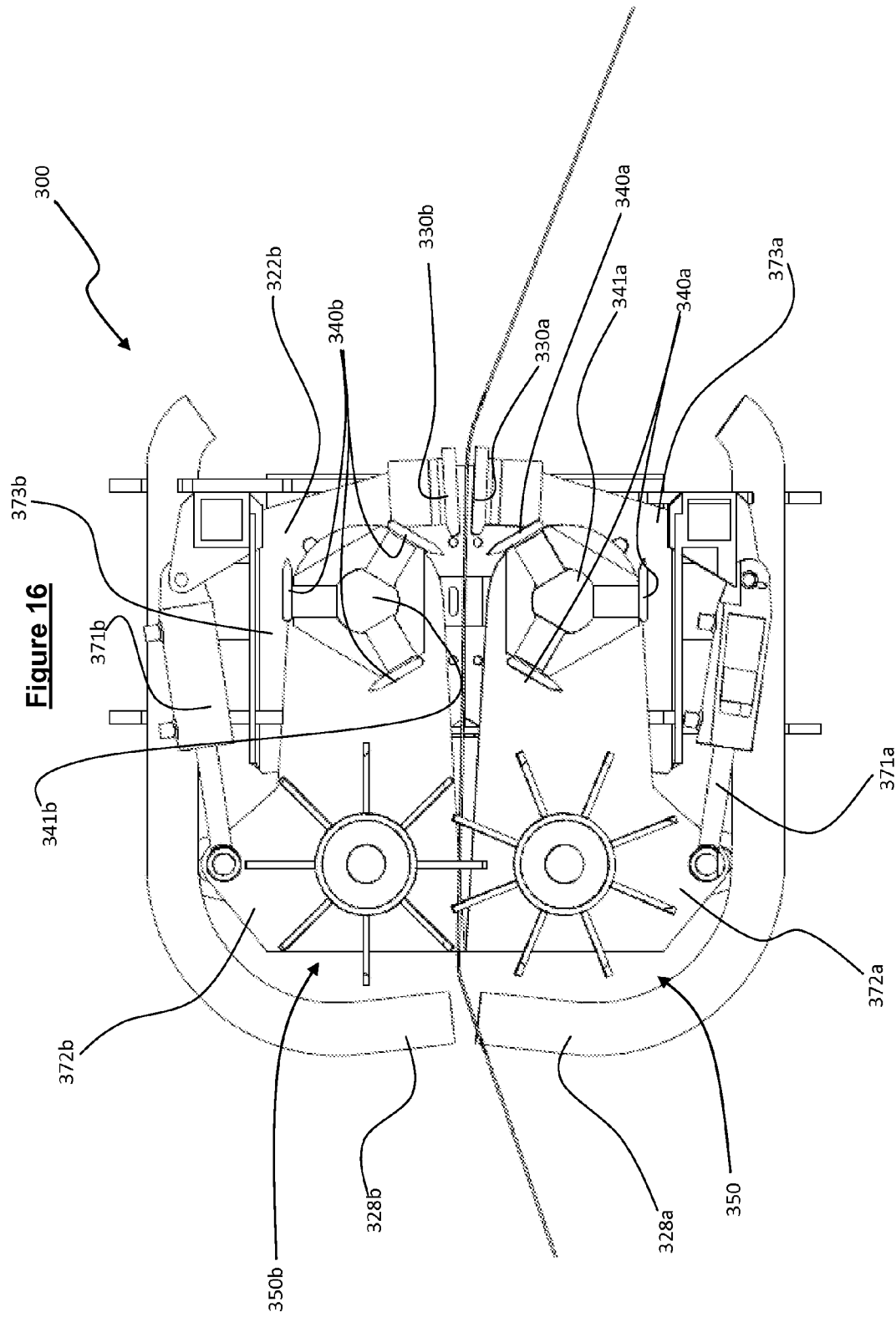
FIG. 16 shows a further cross-sectional side view of the apparatus of FIG. 15.

A fourth embodiment is shown in FIG. 16 and includes an apparatus (300) that is generally similar to the third embodiment (200) but is further compacted, does not have intermediate transverse constraints (233a, 233b) and has an alternative separation mechanism designed to increase the separation between the opposing material guide rollers (350a, 350b) rather than the separation between line guide cross-members (232a, 232b) as in the third embodiment (200).

The apparatus (300) has two halves (322a, 322b) that are each formed as forward (372a, 372b) and rear (373a, 373b) portions. The forward portions (372a, 372b) are pivotally mounted to the rear portions (373a, 373b) to pivot the forward portion with respect to the rear portion (373a, 373b) about the stripping element rotation axis. The material guide rollers (350a, 350b) are mounted to the forward portions (372a, 372b). The material guide separation mechanism has hydraulic rams (371a, 371b) pivotally connected to the respective forward portion (372a, 372b) and also to the frame near skid (325a, 325b). Thus, the separation between the material guide rollers (350a, 350b) can be increased by retracting a rams (371a, 371b) to cause the corresponding forward portions (372a, 372b) to pivot. Similarly to the third embodiment (200), force sensors may be included to monitor the loadings on the material guide rollers (350a, 350b) or alternatively, the rams (371a, 371b) may operate at a pre-set pressure (e.g. 300 psi) such that sufficient divergent loading on the material guide rollers (350a, 350b) is capable of pushing the material guide rollers (350a, 350b) apart against the opposing force applied by the rams (371a, 371b). The rams (371a, 371b) may therefore act as a biasing mechanism, biasing the material guide rollers (350a, 350b) toward each other.

The apparatus (20, 100, 200, 300) are much more compact than the prior art stripping apparatus and the following dimensions, though exemplary only, should provide a sense of scale to the apparatus. It will be appreciated that the apparatus may be scaled to suit the particular stripping application.

It will also thus be appreciated that multiple apparatus may be simultaneously used in various combinations and configurations that would be impractical with the larger prior art strippers.

The overall 'length' of the apparatus from the front-most portion of the material guide rollers (50, 150, 250, 350) to the rearmost portion of the line guide elements (230, 232) is roughly between 400 mm to 600 mm.

The 'width' of the apparatus is determined by the axial length of the material guide elements (50), stripping elements (40) and line guide elements (30) as these elements form the respective stripping assemblies. The material guide elements may be longer than the stripping elements to aid in 'feeding' the cut canes toward the stripping elements, the housing would therefore be tapered inward from the front end adjacent the axial ends of the material guide elements.

The material guide rollers may be approximately 250-450 mm in length.

The stripping elements may be approximately 200-400 mm in length.

The line guide elements may be approximately 200-400 mm in length.

The separation of the closest opposing portions of the arcs delineated by opposing material guide roller ridges (52, 252, 352) is approximately 4-10 mm in the closed configuration and approximately 50 mm to 200 mm when separated using the separation mechanism shown in FIG. 16.

The separation of the closest opposing portions of the arcs delineated by opposing blades (40, 140, 240, 340) is approximately 10-21 mm in the closed configuration.

The separation between the line guide elements (30, 130, 230, 330) is approximately 9-15 mm and approximately 20 mm to 70 mm when separated using the separation mechanism shown in FIG. 15.

The separation between transverse constraints (33, 228, 328) is approximately 200-400 mm The passage between the stripping assemblies is defined by the separation between opposing elements as above and any transverse constraints, e.g. transverse constraints (33, 228, 328) and/or the interior sidewalls of the housing (122, 222, 322). The passage dimensions in preferred embodiments are therefore (4-10 mm by 200-450 mm) at a forward end between the material guide rollers (50, 150, 250, 350) tapering to (9-15 mm by 200-400 mm) between the line guide elements (30, 130, 230, 330).

The stripping elements (40, 140, 240, 340) rotate at greater than 3000 RPM and have a diameter between rotation axis and blade tip of approximately 100-200 mm.

Figure 10:
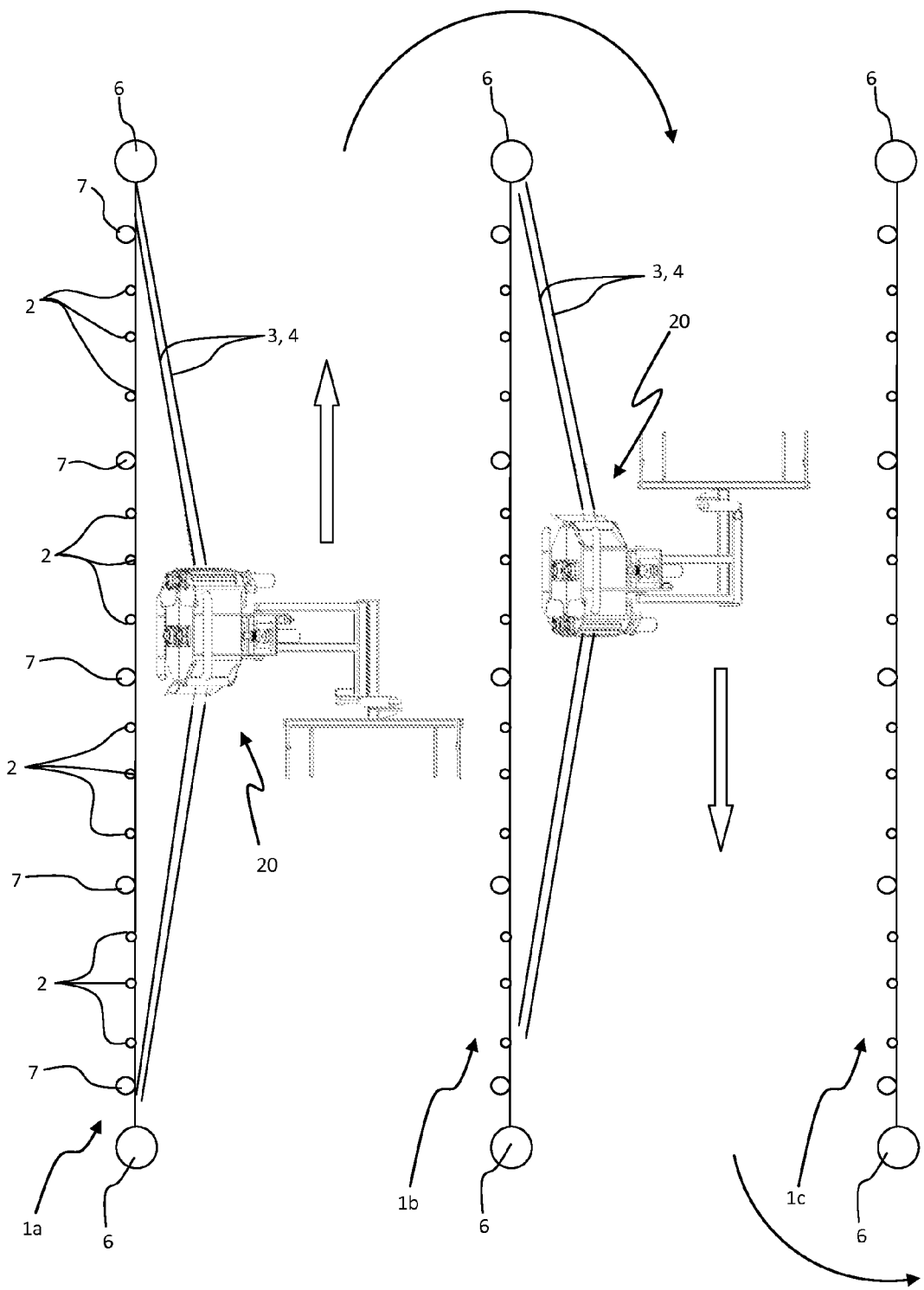
FIG. 10 shows a schematic view of the apparatus of FIGS. 3-8 operating on rows of grapevines.

The method of operation of the apparatus (20) will now be described with respect to FIG. 10, though it should be appreciated the embodiments shown in the other drawings work in substantially the same way.

In prior art cane-pruning, the fruiting wire (3) is fixed to the posts (7). New growth from the canes (8) is guided by the lifting wires (4) which may be periodically lifted over the growing season to train the vines (2) into shape to assist in harvesting, maintenance and sunlight exposure. The lifting wires (4) are necessarily releasably attached to the posts (7) to permit lifting. However, as there is no detachability requirement, the fruiting wire (3) is typically fixed to the posts (7).

The method for stripping the first row (1a) generally includes:
- detaching the wires (3, 4) from posts (7);
- ensuring the stripping apparatus (20) is in the open configuration and left-side orientation (see FIG. 3);
- manoeuvring the apparatus (20) such that the first stripping assembly (21a) is beneath the wires (3, 4) and/or lifting the wires (3, 4) such that the wires (3, 4) are supported by the first line guide roller (30a) and first material guide roller (30b);
- lifting the boom and frame (10) to which the apparatus (20) is attached, and commensurately lifting wires (3, 4) so that the wires (3, 4) are pulled laterally away and upward from the posts (7);
- actuating hydraulic rams (27a, 27b) to move the first (21a) and second (21b) stripping assemblies to the closed configuration (see FIGS. 4 and 7-9);
- actuating the hydraulic motors (43a and 43b), to respectively rotate the blade hubs (41a and 41b) and therefore blades (40a and 40b);
- actuating the hydraulic motors (51a and/or 51b), to respectively rotate one or both material guide rollers (50a and/or 50b);
- driving the carrier with the apparatus (20) along the row (1a) of vines (2) so that the apparatus (20) moves along the wires (3, 4) to strip and cut the canes (8) therefrom;
- when the first row (1a) is finished the hydraulic rams (27a, 27b) are retracted to move the first (21a) and second (21b) stripping assemblies to the open configuration (see FIG. 3);
- the apparatus (20) is lowered and the wires (3, 4) removed and reattached to the posts (7);

To strip the adjacent row (1b) the hydraulic ram (11) is then retracted to pivot the stripping apparatus (20) to the right-side orientation (see FIG. 5) and the aforementioned steps repeated, though with the stripping apparatus (20) inverted such that the second stripping assembly (21b) is beneath the first (21a).

The fruiting wire (3) is thus lifted upwards and to one side of the row of vines (2) so that the apparatus (20) does not contact and potentially damage the vines (2) as it moves along the wires (8, 9).

The lifting wires (4) do not typically have many canes (8) attached and therefore it is not imperative that the lifting wires (4) also be stripped. However, the lifting wires (4) are also lifted using this method as it has more convenient to also strip the lifting wires (4) than to leave the wires (4) in place. The lifting wires (4) if left in place may also impede lifting of the fruiting wire (3).

The prior art techniques of stripping canes (8) from the wires requires manual labour, or alternatively mobile machinery that must stop and start to move around the intermediate posts (7). Moreover, any vines that are to be retained are vulnerable to damage as the prior art machine strippers must move close to the posts and retained vines when stripping. In contrast, the present invention may alleviate both problems by moving the wires (3, 4) well clear of the posts and vines (2) before stripping. Consequently, the apparatus (20) is able to move uninterrupted along the length of wires (3, 4); removing the cut canes (8), while minimising the risk of damaging the retained vines (5).

Aspects of the present invention have been described by way of example only and it should be appreciated that modifications and additions may be made thereto without departing from the scope thereof.

What is claimed:

1. An apparatus for use in stripping irregular material from a line during relative movement between the apparatus and line, said apparatus including a material guide, stripping mechanism and line guide:
    said material guide being configured to guide the irregular material on the line into engagement with the stripping mechanism during said relative movement, said material guide including first and second driven material guide elements respectively rotatable about first and second material guide rotation axes;
    said stripping mechanism including first and second driven stripping elements respectively rotatable about first and second stripping element rotation axes;
    said line guide including first and second line guide elements;
wherein the first line guide element, first stripping element and first material guide element collectively form a first stripping assembly and the second line guide element, second stripping element and second material guide element collectively form a second stripping assembly, the line passing between said stripping assemblies during said stripping, said stripping assemblies orientated during said stripping such that the first material guide rotation axis and the first stripping element rotation axis are on a first lateral side of the line and the second material guide rotation axis and the second stripping element rotation axis are on a second lateral side of the line and the first stripping assembly is configured such that the first stripping element is interposed between said first material guide element and said first line guide element and the second stripping assembly is configured such that the second stripping element is interposed between said second material guide element and said second line guide element.

2. The apparatus as claimed in claim 1, wherein the line is laterally constrained within a passage through the apparatus defined sequentially by the space between the:

first and second material guide elements in the plane extending between the first and second material guide element rotation axes;

first and second stripping elements in the plane extending between the first and second stripping element rotation axes, and first and second line guide elements in the plane extending between the first and second line guide elements.

3. The apparatus as claimed in claim 1, wherein the line is laterally constrained within a volumetric passage defined by:

the first and second material guide elements in the plane extending between the first and second material guide element rotation axes;

the first and second line guide elements in the plane extending between the first and second line guide elements, and at least two transverse constraints.

4. The apparatus as claimed in claim 1, wherein the span between:

the line and any material, and at least one of the first and second stripping elements unobstructed.

5. The apparatus as claimed in claim 1, wherein the aspect ratio of the space between the closest elements of the:

transverse constraints, to first and second line guide elements, is at least 5:1 (five-to-one).

6. The apparatus as claimed in claim 1, wherein the stripping apparatus is configured to be re-orientated from a first orientation wherein at least one of the first line guide element and first material guide element resists lateral line tension and a second orientation wherein at least one of the second line guide element and second material guide element resists lateral line tension.

7. The apparatus as claimed in claim 6, wherein said stripping apparatus is re-orientated between said first and second orientations by at least partially inverting the stripping apparatus by pivoting said apparatus about a reorientation pivot axis.

8. The apparatus as claimed in claim 7, wherein said re-orientation pivot axis is perpendicular to at least one of the:

stripping element rotation axes, and material guide rotation axes.

9. The apparatus as claimed in claim 1, wherein the apparatus is configurable between:

an open configuration, and a closed 'stripping' configuration wherein the first and second stripping assemblies are respectively moved to said first and second sides of the line, and wherein the stripping apparatus is configurable between the open and closed positions by respectively pivoting at least one of the first and second stripping assemblies about first and second assembly pivot axes.

10. The apparatus as claimed in claim 1, wherein the line guide elements have a primary axis extending non-parallel to the line.

11. The apparatus as claimed in claim 10, wherein the primary axis of the first line guide element and the rotation axis of the first material guide element are substantially parallel.

12. The apparatus as claimed in claim 10, wherein the primary axis of the second line guide element and the rotation axis of second material guide element are substantially parallel.

13. The apparatus as claimed in claim 9, wherein the line guide elements have a primary axis extending non-parallel to the line and in the closed configuration, the primary axes of the line guide elements and the rotation axes of the material guide elements are substantially parallel.

14. The apparatus as claimed in claim 1, wherein at least one of the first and second stripping element rotation axes is substantially parallel to at least one of the first and second material guide element rotation axes.

15. The apparatus as claimed in claim 1, wherein the second stripping element rotation axis is substantially parallel to the second material guide element rotation axis.

16. The apparatus as claimed in claim 9, wherein in the closed configuration, primary axes of the line guide elements and the rotation axes of the stripping elements are substantially parallel.

17. The apparatus as claimed in claim 1, wherein the first and second stripping assemblies are substantially symmetrical about at least one of:

a central axis and a central plane of the passage.

18. The apparatus as claimed in claim 1, wherein there are no intervening obstructing elements between at least one of:

the material guide and stripping mechanism, and between the stripping mechanism and line guide with respect to the direction of relative line movement.

19. The apparatus as claimed in claim 2, wherein the stripping apparatus is capable of altering said passage volume in response to changes in at least one force change applied to at least one said material guide element and at least one said line guide element, said force change detected by a force sensor including a pressure sensor in hydraulic lines or a mechanical force transducer.

20. The apparatus as claimed in claim 2, wherein said passage volume is controlled by a biasing mechanism configured to bias at least one of the:

first and second material guide elements, and first and second line guide elements toward each other.

21. The apparatus as claimed in claim 1, wherein the material guide elements are configured to rotate in opposite directions during stripping.

22. The apparatus as claimed in claim 1, wherein at least one said material guide element includes outwardly extending protrusions for assisting in vertically displacing the material, gripping material on the line and guiding the material toward the stripping mechanism.

23. The apparatus as claimed in claim 22, wherein said protrusions are ridges have a series of wedge-shaped serrations to assist in gripping the material.

24. The apparatus as claimed in claim 1, wherein the stripping elements are configured to rotate in opposite directions during stripping.

25. The apparatus as claimed in claim 1, wherein the first material guide element rotates in an opposite direction to the first stripping element and the second material guide element rotates in an opposite direction to the second stripping element.

26. The apparatus as claimed in claim 1, wherein at least one said stripping element includes at least one blade with a leading edge orientated parallel to the stripping element rotation axis.

27. The apparatus as claimed in claim 1, wherein at least one said stripping element includes at least one blade with a leading edge configured to delineate a cylindrical volume about the stripping element rotation axis.

28. The apparatus as claimed in claim 1, wherein the line guide elements include cross-members with leading edges orientated toward said stripping elements and formed as a blade edge for assisting removal of material on the line passing between the line guide elements.

29. The apparatus as claimed in claim 1, wherein the first and second line guide elements include rollers respectively locatable during stripping on the first and second lateral sides of the line.

30. The apparatus as claimed in claim 3, wherein the transverse constraints include members orientated substantially perpendicular to a material guide element rotation axis.

31. The apparatus as claimed in claim 1, including a housing having a first and second halves to which the first and second stripping assemblies are mounted wherein the material guide is located at an entry opening to said housing and said line guide and stripping mechanisms are located within the housing.

32. The apparatus as claimed in claim 31, wherein the housing halves form transverse constraints by constraining transverse movement of the line to a range between side-walls of the housing.

33. A method of stripping organic material from at least one line using an apparatus during relative movement between the apparatus and line, said apparatus including a material guide, stripping mechanism and line guide:

said material guide being configured to guide the irregular material on the line into engagement with the stripping mechanism during said relative movement, said material guide including first and second driven material guide elements respectively rotatable about first and second material guide rotation axes;

said stripping mechanism including first and second driven stripping elements respectively rotatable about first and second stripping element rotation axes;

said line guide including first and second line guide elements;

wherein the first line guide element, first stripping element and first material guide element collectively form a first stripping assembly and the second line guide element, second stripping element and second material guide element collectively form a second stripping assembly, the line passing between said stripping assemblies during said stripping, said stripping assemblies orientated during said stripping such that the first material guide rotation axis and the first stripping element rotation axis are on a first lateral side of the line and the second material guide rotation axis and the second stripping element rotation axis are on a second lateral side of the line;

said method including the steps of:

positioning at least one line on the first or second stripping assembly on the first or second side of the line respectively, reconfiguring the apparatus to a closed configuration by moving the second or first stripping assembly to the second or first side respectively, vertically displacing said first or second stripping assembly to vertically displace the line, moving the apparatus relative to the line while rotating the material guide elements and stripping elements to strip the organic material from the line.

\* \* \* \* \*